United States Patent
McWaters

(10) Patent No.: US 10,650,044 B2
(45) Date of Patent: May 12, 2020

(54) METHOD AND APPARATUS FOR CONVERTING FROM A SOURCE DATABASE SYSTEM TO A DESTINATION DATABASE SYSTEM

(71) Applicant: Datastrong L.L.C., Fairfax, VA (US)

(72) Inventor: Robert Wesley McWaters, Harvard, MA (US)

(73) Assignee: Datastrong, L.L.C., Fairfax, VA (US)

(*) Notice: Subject to any disclaimer, the term of this patent is extended or adjusted under 35 U.S.C. 154(b) by 379 days.

(21) Appl. No.: 15/652,241

(22) Filed: Jul. 18, 2017

(65) Prior Publication Data
US 2019/0026386 A1   Jan. 24, 2019

(51) Int. Cl.
| | | |
|---|---|---|
| G06F 16/00 | (2019.01) |
| G06F 16/84 | (2019.01) |
| G06F 16/25 | (2019.01) |
| G06F 16/21 | (2019.01) |
| G06F 3/0482 | (2013.01) |
| G06F 16/81 | (2019.01) |

(52) U.S. Cl.
CPC ............ G06F 16/84 (2019.01); G06F 16/214 (2019.01); G06F 16/258 (2019.01); *G06F 3/0482* (2013.01); *G06F 16/81* (2019.01)

(58) Field of Classification Search
None
See application file for complete search history.

(56) References Cited

U.S. PATENT DOCUMENTS

| | | | |
|---|---|---|---|
| 9,034,361 B2 | 5/2015 | Putman |
| 9,069,805 B2 | 6/2015 | Ritter et al. |
| 9,176,997 B2 | 11/2015 | Balasubramanian et al. |
| 9,201,558 B1 | 12/2015 | Dingman et al. |
| 9,280,569 B2 | 3/2016 | Do et al. |
| 9,286,571 B2 | 3/2016 | Cao et al. |
| 9,430,505 B2 | 8/2016 | Padmanabhan et al. |
| 9,519,663 B2 | 12/2016 | Engleko et al. |
| 9,552,380 B2 | 1/2017 | Mack |
| 9,563,650 B2 | 2/2017 | Balasubramanian et al. |
| 9,563,686 B2 | 2/2017 | Chen et al. |

(Continued)

*Primary Examiner* — Thu N Nguyen
(74) *Attorney, Agent, or Firm* — Clayton, McKay & Bailey, PC

(57) ABSTRACT

A method of converting a source database system to a destination database system includes importing system tables and semantic metadata from the source database system, parsing the imported semantic metadata and identifying associations between table elements of the imported system tables, generating a conversion scheme in the metadata database, and defining an attribute in the conversion scheme in accordance with a metadata model of the destination database system for each association identified. Defining each attribute may include identifying additional attributes, determining an inter-cardinality between table elements, setting an intra-cardinality between a table element of the additional attribute and a specified table element of the attribute in a same imported system table, defining a relationship between the attribute and the additional attribute according to the inter-cardinality and the intra-cardinality, and grouping together the specified table elements and any defined relationships in a metadata definition of the attribute in the conversion scheme.

20 Claims, 12 Drawing Sheets

(56) References Cited

U.S. PATENT DOCUMENTS

| | | | |
|---|---|---|---|
| 2010/0169318 A1* | 7/2010 | Thompson | G06F 16/957 707/737 |
| 2014/0181154 A1* | 6/2014 | Amulu | G06F 16/28 707/803 |
| 2016/0012042 A1 | 1/2016 | Balasubramanian | |
| 2016/0162557 A1 | 6/2016 | DelGobbo et al. | |
| 2017/0364539 A1* | 12/2017 | Jacob | G06F 16/25 |

* cited by examiner

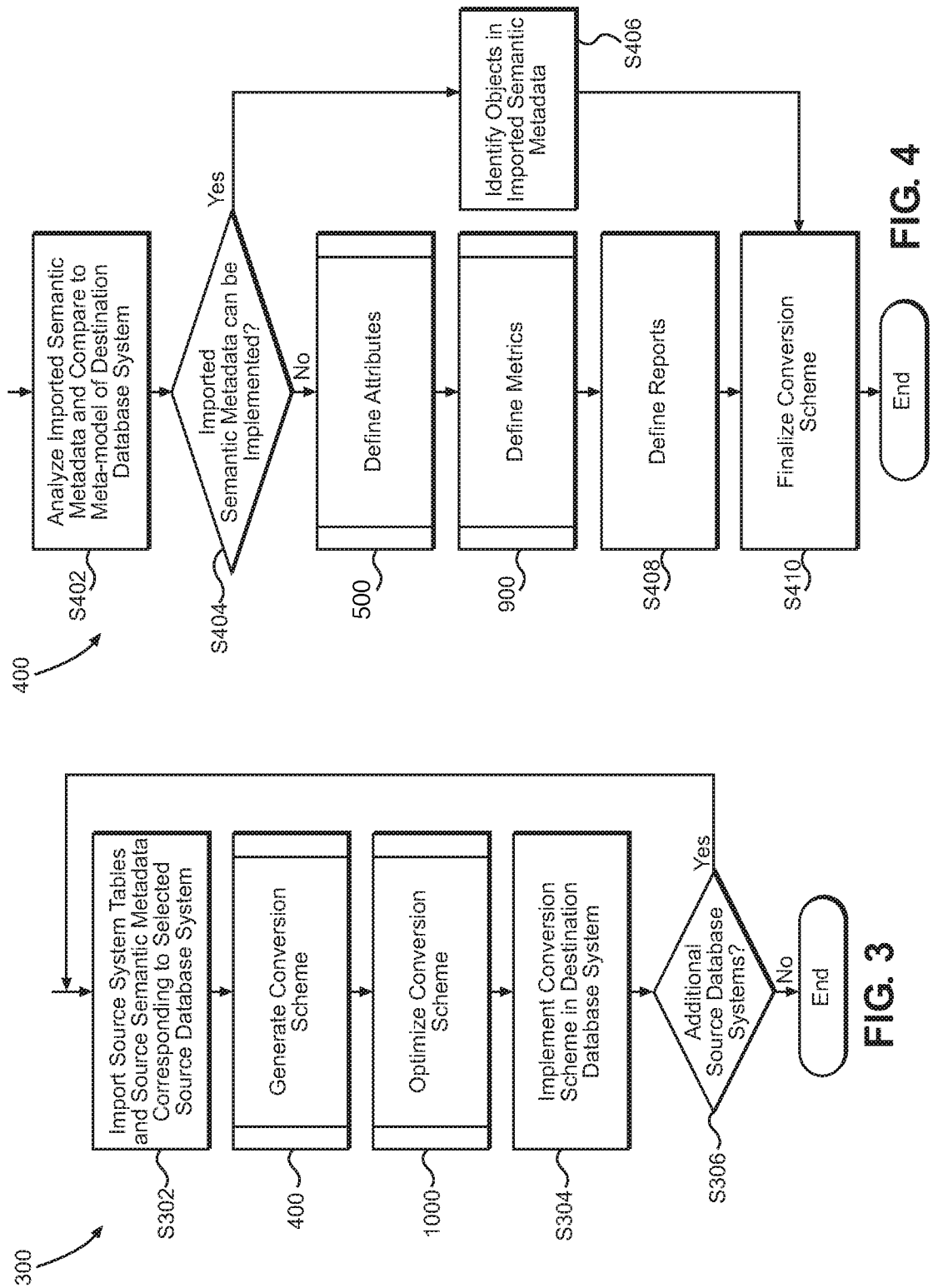

METHOD AND APPARATUS FOR CONVERTING FROM A SOURCE DATABASE SYSTEM TO A DESTINATION DATABASE SYSTEM

TECHNICAL FIELD

The present disclosure relates generally to the conversion of data between different database systems, and more specifically to generating and optimizing data that is implemented to facilitate conversion from one database system to another database system.

BACKGROUND

Databases are frequently used to support many different kinds of activities, including storing and processing business data for the purposes of reporting and analysis by members of a business. The amount of processed data and stored data may be large, and therefore need to be organized in the database according to a specific data model for efficient use. A data model may refer to a physical organization of data (e.g. how/where data is stored in database tables, how instances of data are related, etc.) within the database.

A database system may access the data stored in the database, and facilitate processing and reporting activities based on the data, at least in part, by implementing a meta-model. Within the database system, the meta-model may define a set of metadata objects and types of relations there-between so as to represent, and facilitate access to (e.g., for reporting), the data in the database. The metadata objects may describe various aspects of the data (e.g. database tables, fields/columns of database tables, etc.) in the database, taking into account the data model. Further, the meta-model may define types of metadata objects that may be further instantiated in/by the database system.

The database system may be implemented through a data reporting tool or other type of application, which accesses data of the database system ("system data") including the metadata objects, in order to access, process, view, and/or cause new or modified data to be stored in the data and/or the system data. Further, the application may be used to create reports and/or visual representations of the data, or derivations of the data from the database. The system data may be organized in a specific way according to the meta-model so that the application, which may be specific to the meta-model and/or database system, can access, modify, store, organize, and/or represent the data and/or system data in a specific manner.

However, it is not uncommon for a company to want to change the manner in which data is accessed, processed, stored, viewed, and/or reported. Thus, as an example, a company may desire to change from one database system to a new database system, but desire to retain some or all of the functionality (e.g. reporting ability) of the previous database system. However, with respect to the previous database system, the new database system may have a different meta-model, and may relate to and/or access data in the database, define types of metadata objects, and/or organize respective system data differently. As a result, a company may have to systematically organize system data migrated from the previous database system in terms of a meta-model of the new database system, in order to create or modify new system data that maintains the functionality of the previous database system. Accordingly, much time, effort, and resources may be expended in preforming such systematic modifications in order to accomplish these objectives.

These and other issues are solved by a method and apparatus for converting from a source database system to a destination database system, of the present disclosure.

SUMMARY

According to certain aspects of the present disclosure, a computer-implemented method of converting a source database system to a destination database system includes importing system tables and semantic metadata from the source database system into a metadata database, parsing the imported semantic metadata and identifying associations between table elements of the imported system tables, generating a conversion scheme in the metadata database, and defining an attribute in the conversion scheme in accordance with a metadata model of the destination database system for each association identified. According to another aspect of the present disclosure, defining each attribute corresponding to an association may include identifying, for each imported system table that includes a table element specified in the association, additional attributes, determining an inter-cardinality between the specified table elements, setting an intra-cardinality between a table element of the additional attribute and a specified table element included in a same imported system table as the table element of the additional attribute, defining a relationship between the attribute and the additional attribute according to the determined inter-cardinality and a respective intra-cardinality, and grouping together the specified table elements and any defined relationships in a metadata definition of the attribute in the conversion scheme.

According to another aspect of the present disclosure, a system may include one or more computing devices including at least one processor, and a non-transitory computer-readable medium coupled to the one or more computing devices. The non-transitory computer readable medium having instructions stored thereon which, when executed by the one or more computing devices, cause the one or more computing devices to perform operations including importing system tables and semantic metadata from the source database system into a metadata database, parsing the imported semantic metadata and identifying associations between table elements of the imported system tables, generating a conversion scheme in the metadata database, and defining an attribute in the conversion scheme in accordance with a metadata model of the destination database system for each association identified. According to another aspect of the present disclosure, defining each attribute corresponding to an association may include identifying, for each imported system table that includes a table element specified in the association, additional attributes, determining an inter-cardinality between the specified table elements, setting an intra-cardinality between a table element of the additional attribute and a specified table element included in a same imported system table as the table element of the additional attribute, defining a relationship between the attribute and the additional attribute according to the determined inter-cardinality and a respective intra-cardinality, and grouping together the specified table elements and any defined relationships in a metadata definition of the attribute in the conversion scheme.

According to still another aspect of the present disclosure, a non-transitory computer-readable medium having instructions stored thereon which, when executed by the one or more computing devices, cause the one or more computing devices to import system tables and semantic metadata from a source database system into a metadata database, parse the imported semantic metadata and identify associations between table elements of the imported system tables, generate a conversion scheme in the metadata database, and define an attribute in the conversion scheme in accordance with a meta-model of a destination database system for each association identified. Further, to define each attribute corresponding to an association, the non-transitory computer-readable medium cause the one or more computing devices to identify, for each imported system table that includes a table element specified in the association, additional attributes, determine an inter-cardinality between the specified table elements, set an intra-cardinality between a table element of the additional attribute and a specified table element included in a same imported system table as the table element of the additional attribute, define a relationship between the attribute and the additional attribute according to the determined inter-cardinality and a respective intra-cardinality, and group together the specified table elements and any defined relationships in a metadata definition of the attribute in the conversion scheme.

BRIEF DESCRIPTION OF THE DRAWINGS

Aspects of the present disclosure will hereafter be described referring to the accompanying drawings, wherein like numerals denote like elements.

FIG. 3 is a flowchart illustrating an exemplary method of converting from a source database system to a destination database system, according to an aspect of the present disclosure.

FIG. 4 is a flowchart illustrating an exemplary method of generating a conversion scheme, according to an aspect of the present disclosure.

The figures presented are intended solely for the purpose of illustration and they are, therefore, neither desired nor intended to limit the subject matter of the disclosure to any or all of the exact details of construction shown, except insofar as they may be deemed essential to the claims.

DETAILED DESCRIPTION

For the purposes of this disclosure and unless otherwise specified, "a" or "an" means "one or more". Still further, using "and" or "or" in the detailed description is intended to include "and/or" unless specifically indicated otherwise. Aspects of the disclosure may be implemented as a method, apparatus, or article of manufacture using standard programming and/or engineering techniques to produce software, firmware, hardware, or any combination thereof to control a computer implementation of the methods described herein. All methods described herein can be performed in any suitable order unless otherwise indicated herein or otherwise clearly contradicted by context. Aspects of the disclosure will now be described in detail with reference to the figures, wherein like reference numbers refer to like elements throughout, unless specified otherwise.

Figure 1:
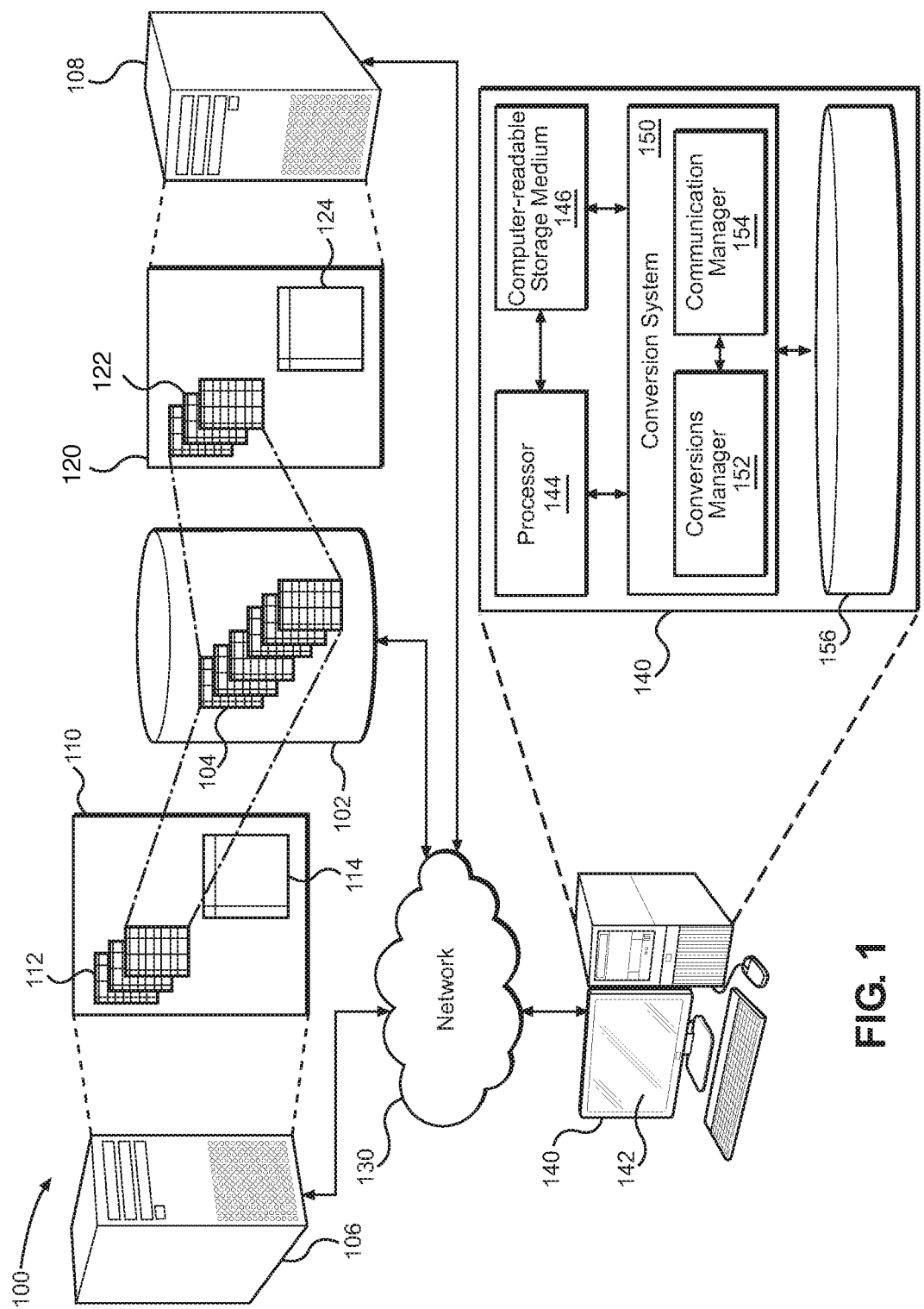
FIG. 1 illustrates a diagram representing an exemplary distributed computing system including a computing device, according to an aspect of the present disclosure.

FIG. 1 illustrates a diagram representing an exemplary distributed computing system 100 including a computing device 140, according to an aspect of the present disclosure. The computing system 100 further includes at least one database 102, a source server 106, and a destination server 108. The source server 106 (e.g. SAS® Workspace Server, SAP Central Management Server, Microstrategy Intelligence Server, etc.) implements and/or embodies a source database system 110 including source system tables 112 and source semantic metadata 114. The destination server 108 (e.g. a Microstrategy Intelligence Server) implements and/or embodies a destination database system 120 including destination system tables 122 and destination semantic metadata 124. The computing system 100 further includes a network 130 for exchanging communications between the database 102, source server 106, destination server 108, and the computing device 140.

The database 102 may be stored on one or more computer-readable medium, and may include one or more databases, such as, relational, transactional, hierarchical, multi-dimensional (e.g., OLAP), object oriented databases, and the like. Generally, the database 102 may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol. Further, the data of the database 102 may be embodied by a plurality of databases tables 104, as illustrated in FIG. 1.

In addition, the database 102 may be implemented through a database management/architecture system (DBMS) that may include software designed to define, manipulate, retrieve, and manage data within the database tables 104 of the database 102. The DBMS (e.g. MySQL from Oracle Corporation, PostgreSQL from The PostgreSQL Global Development Group, Microsoft Access from Microsoft Corporation, Hadoop from the Apache Software Foundation, Mircrosoft SQL Server from Microsoft, Oracle RDBMS from Oracle Corporation, etc.) may use a standard method of cataloging, retrieving, and running queries on data in the database 102. Further, the DBMS may manage incoming data by organizing it and providing ways for the data to be modified or extracted by, for example, a database system such as the source database system 110 or the destination database system 120.

Each of the source server 106 and the destination server 108 may be embodied as an electronic device configured to store data (e.g. system data) and exchange communications with each other, the database 102, the computing device 140, and/or other servers (e.g., multiple servers or computers), over a direct connection or the network 130 as illustrated in FIG. 1. As a result, the first database system 110 and the second database system 120 may be configured to store data (e.g. system data) and output the data in response to requests (e.g., Structured Query Language (SQL) statements or queries), and thus may exchange communications through the source server 106 and the destination server 108, respectively, to receive input defining data needed and provide the data needed as output.

According to an aspect of the present disclosure, each database system 110, 120 and respective computer memory within which the database system 110, 120 is implemented, may reside in a single computing device (e.g. source and destination servers 106, 108) or be distributed or partitioned across multiple different computing devices. Furthermore, even within the memory of a single computing device, each of the database systems 110, 120 may be implemented across multiple different partitions. As discussed above, the source database system 110 includes the source system tables 112 and the source semantic metadata 114; whereas the destination database system 120 includes the destination system tables 122 and the destination semantic metadata 124.

The source system tables 112 are mapped to the database tables 104 of the database 102. According to one aspect of the present disclosure, once a process of converting from a source database system to a destination database system ("conversion process 300"), as discussed in more detail at least with reference to FIGS. 3-11, is completed, the destination system tables 122 may be mapped to the database tables 104. As provided herein, "system table" refers to a data structure including a table of a database system that may represent and be mapped in some way to a database table or tables, and includes table elements that represent, characterize, and/or are mapped to fields/columns of the database tables. Further, the system tables may store data related to (about) the data in corresponding database tables (e.g. data type, value range, character type, etc.), and be queried by a database system in order to create, maintain, and/or update reports. As illustrated in FIG. 1 and discussed above, the destination system tables 122, and thus the destination database system 120, may be mapped to the database 102 as part of the conversion process 300. According to another aspect of the present disclosure, the conversion process 300 may include the database tables 104 being migrated to a new database (not shown) that implements a different DBMS than the database 102. Further according to this aspect, the destination system tables 122 may be mapped to the database tables 104 as provided in the new database.

According to an aspect of the present disclosure, each of the source semantic metadata 114 and the destination semantic metadata 124 may be stored as metadata that: (1) is descriptive of data that is stored and managed in a respective database system, and (2) facilitates access to captured and archived data for further use. Each of the source semantic metadata 114 and the destination semantic metadata 124 may be an implementation of a respective meta-model, which defines types of objects and relationships used to characterize the contents of the database 102. The source database system 110 may be a different type of database system than the destination database system 120. Accordingly, the source semantic metadata 114 and the destination semantic metadata 124 may be implementations of different meta-models and therefore encompass completely different sets of metadata objects.

In general, metadata objects of a given meta-model: may include system tables and, at least in the case of the destination database system 120, may further include attributes, relationships, and metrics; and may be mapped to structures in a given database and represent data utilized for reporting. Semantic metadata may encompass an organized collection of metadata objects as defined by a meta-model. Further, sematic metadata may implement the metadata objects in a semantic metadata implementation (also know as a semantic layer) that may be utilized by a user to analyze and report on data in a non-technical language. Examples of types of semantic layers include MicroStrategy projects, SAP® BusinessObjects™ universes, IBM® Cognos® Framework Manager models, and SAS® information maps. Each type of semantic metadata implementation may be supported by its own reporting and analysis tools that are not interchangeable between different types of semantic metadata designed to operate with a specific database system. According to an aspect of the present disclosure the source semantic metadata 114 may be an implementation of MicroStrategy projects, SAP® BusinessObjects' universes, IBM® Cognos® Framework Manager models, and SAS® information maps; and the destination semantic metadata 124 may be an implementation of MicroStrategy projects.

The network 130 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (DSL)), radio, television, cable, satellite, or any other delivery or tunneling mechanism for carrying data. The network 130 may include multiple networks or subnetworks, each of which may include, for example, a wired or wireless data pathway. The network 130 may include a circuit-switched network, a packet-switched data network, networks based on the Internet protocol (IP) or asynchronous transfer mode (ATM), or any other network able to carry electronic communications.

The computing system 100 may further include the computing device 140 that includes a graphical user interface 142 ("GUI 142"), and a processor 144 that executes software instructions or code stored in a computer-readable storage medium 146. The computing device 140 may include a general-purpose computer (e.g. a desktop personal computer, a workstation, or a laptop), or in some cases, a mobile or wireless device such as a cell phone, smartphone, tablet PC, a personal digital assistant, or any other computing device configured to communicate over a network and display information. The processor 144 may be a general or special purpose microprocessor, a sole processor, one of multiple processors of any kind of computer, a single-threaded processor, a multi-threaded processor, or any type of processor suitable for the execution of a program of instructions. According to an aspect of the present disclosure the computer-readable storage medium 146 may provide a memory of the computing device 140. According to another aspect of the present disclosure the computing device may include a memory in the form of a volatile memory unit or a non-volatile memory unit.

The computing device 140 further includes a conversion system 150 for converting the source semantic metadata 114 into semantic metadata that can be implemented by the destination database system 120 as the destination semantic metadata 124. In particular, the source semantic metadata 114 is converted such that the functionality of the set of metadata objects encompassed by the source semantic metadata 114 can be replicated by the set of metadata objects encompassed by the destination semantic metadata 124, the creation of which is caused by the conversion system 150. The conversion system 150 includes a conversion manger 152, a communication manager 154, and a metadata database 156 as described in more detail with reference to FIG. 2.

Figure 2:
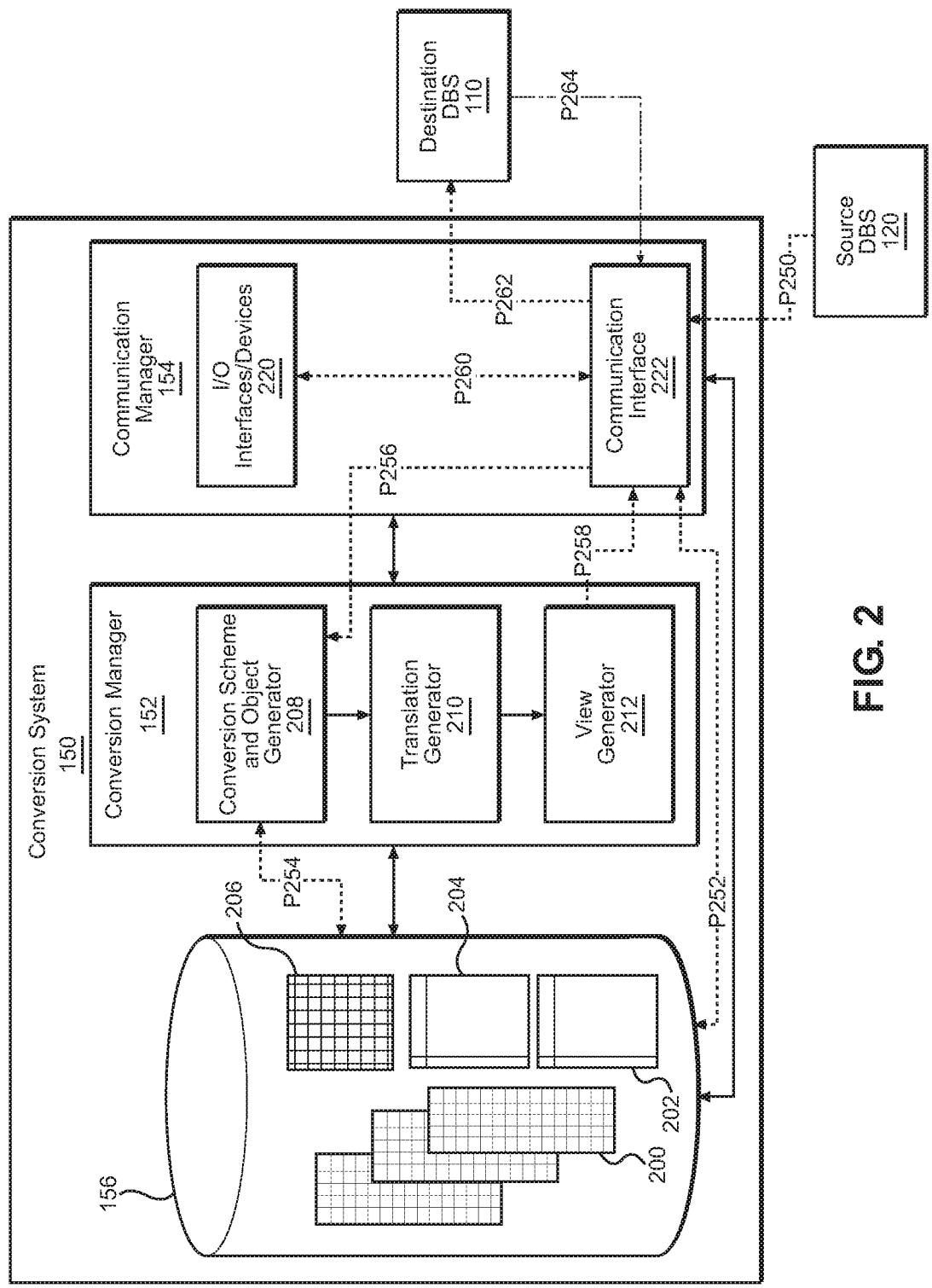
FIG. 2 illustrates a block diagram of a conversion system, according to an aspect of the present disclosure.

FIG. 2 illustrates a block diagram of the conversion system 150, according to an aspect of the present disclosure. The conversion system 150 includes the metadata database 156 which may be a metadata repository for storing the source system tables 112 and the source semantic metadata 114 as imported system tables 200 and imported semantic metadata 202. In addition, a conversion scheme 204, and any conversion system tables 206 generated by a conversion scheme and object generator 208 (hereafter referred to as "conversion scheme generator 208") may be stored in the metadata database 156.

Aspects of the conversion system 150, in particular, aspects of the conversion manager 152, may be implemented in software (including computer readable and/or computer-executable instructions) stored in the computer-readable storage medium 146 and accessible by the processor 144 for execution of instructions that embody the processes described herein. According to an aspect of the present disclosure, the conversion manager 152 and communication manager 154 may be implemented, at least in part, as a web application that receives hypertext transport protocol (HTTP) responses and sends HTTP requests. The HTTP responses may include web pages including hypertext markup language (HTML) documents and linked elements generated in response to the HTTP requests.

The conversion scheme 204 may include metadata that includes semantic metadata, or code that when executed creates semantic metadata for addition to or modification, substitution, or modeling of semantic metadata, such as the destination semantic metadata 124. According to another aspect of the present disclosure, the metadata of the conversion scheme 204 may include code that when executed, creates a set of metadata objects of the semantic metadata stored in or created by the metadata of the conversion scheme 204. Further, the metadata of the conversion scheme 204 may include a set of definitions of the metadata objects of the semantic metadata stored in or created by the metadata of the conversion scheme 204. According to another aspect of the present disclosure, the conversion scheme 204 may include a set of executable instructions that act on metadata created thereby.

The metadata of the conversion scheme 204, and thereby any semantic metadata created thereby or stored therein, is mapped to the imported system tables 200 and conversion system tables 206 generated by the conversion scheme generator 208. Accordingly, the metadata of the conversion scheme 204 is mapped or otherwise linked through the imported and conversion system tables 200, 206, to the data in the database tables 104. According to another aspect of the present disclosure, the metadata of the conversion scheme 204 may include a set of instructions that when executed, instantiate tables elements in the destination system tables 122 according to the imported and conversion system tables 200, 206, and thereby maps the destination system tables 122 to the database tables 104.

As illustrated in FIG. 2, the conversion manager 152 includes a translation generator 210 and a view generator 212. Once the conversion scheme 204 and any conversion tables 206 are generated, the translation generator 210 analyzes (e.g. reads, parse, etc.) both the imported semantic metadata 202 and the conversion scheme 204, and generates a translation of any attribute or metric defined by the conversion scheme 204 in terms of the source semantic metadata 202.

Attributes and metrics are discussed in more detail herein with reference to FIG. 4, but in general, correspond to metadata objects, and are defined according to combinations of data elements in the imported semantic metadata 202, the imported system tables 200, and the conversion system tables 206 as identified by the conversion scheme generator 208. However, especially in the case where the meta-models incorporated by the source and destination database systems 110, 120 are different, these attributes and metrics may not exist in the imported semantic metadata 202. Thus, the translation generator 210 creates an expression that describes the combination of data elements in the imported semantic metadata 202 that defines a new attribute or metric that can be implemented by the destination database system 120. Depending on the properties of a given attribute or metric (e.g. how it maps to and is defined by a data element or elements in the imported semantic metadata 202), the exact expression ("translation expression") may or may not exist in the imported semantic metadata 202. However, the mapping of the expression to the newly created attribute or metric is entirely determined and set forth by the translation generator 210 of the conversion manager 152.

As noted herein, the conversion manager 152 includes the view generator 212 that generates views of the conversion scheme 204 or portions thereof discussed in more detail with reference to FIGS. 11-13. Further, the view generator 212 generates views of editable definitions of attributes and metrics encompassed by the conversion scheme 204, translations generated by the translation generator 210, and a conversion status of the various metadata objects defined in the conversion scheme 204. As discussed, each translation includes a translation expression and a representative mapping of a respective attribute or metric to the translation expression. In general, the conversion manager 152 may be a service or stand-alone application that converts the semantic metadata and system tables of the source database system 110 into a form that is useable by the destination database system 120. Operation by the conversion manager 152 may be triggered by an overall software conversion process where the conversion manager 152 automatically determines that a conversion is required, or may be triggered by a series of user inputs. The conversion manager 152 may provide overall control/management of the conversion process 300, handling of production data requests, confirmation of data conversion success, and logging of data conversion results. Additionally, the conversion manager 152 may perform exception handling.

The views generated by the view generator 212 are received by a communication interface 222 of the communication manager 152 and transmitted to, or accessed by, the Input/Output Interfaces and Devices 220 (hereafter referred to as "I/O devices 220"). The I/O devices 220 include the GUI 142, and may further include a keyboard, and/or a pointing device such as a mouse or a trackball by which a user can provide input to the computer device 140. The I/O devices 220 may further include other peripheral devices that may transmit data and receive input from the communication interface 222.

The communication interface 222 provides an interface for receiving and transmitting data between devices using various protocols, transmission technologies, and media. According to an aspect of the present disclosure the communication interface 222 may include a central BUS that may be configured to coordinate I/O traffic between the processor 144, the computer-readable storage medium 146, the conversion manager 152, the metadata database 156, the network 130, and any peripherals included with the I/O devices 220.

Data paths P250-P262 are illustrated in FIG. 2 to aid in a description of the data managed by the computing device 140, and the sources and destinations of said data. The data paths P250-P262 do not necessarily represent connections, either physical or wireless, between the components of the computing system 100 or computing device 140 discussed above. Transmission, as it relates to the following description of the data paths P250-P262, may include sending and receiving of data from one component to another by said components, or merely refer to what data is before and after being processed by a single component which embodies one or more components of the computing system 100.

Data paths P250 and P252 are illustrated to represent the transmission of the source semantic system tables 112 and source semantic metadata 114 from the source database system 110 to the metadata database 156 of the conversion system 152. Data path P254 is illustrated to represent the transmission of the imported system tables and semantic metadata 200, 202 to the conversion scheme generator 208. Data paths P254 and P256 are illustrated to represent the transmission of the conversion scheme 204, the conversion system tables 206, and any modifications to the conversion scheme 204 as a result of the reception of metadata object definition modifications through the GUI 142, from the conversion scheme generator 208 to the metadata database 156.

Data paths P258 and P260 are illustrated to represent the transmission of the views of the conversion scheme 204, the metadata object editable definitions, and the translations from the view generator 212 to the GUI 142. Data paths P260 and P256 are illustrated to represent the transmission, from the GUI 142 to the conversion scheme generator 208, of the data representing a user input from the GUI 142 modifying the definition of any metadata object in the conversion scheme 204. Data paths P252 and P262 are illustrated to represent the transmission of the imported system tables 200, the conversion scheme 204, and the conversion system tables 206 from the metadata database 156 to the destination database system 120.

According to an aspect of the present disclosure, the conversion scheme generator 208 may have stored there within, or have access to a portion of the conversion system 150 in which is stored, definitional data related to the meta-model of the destination database system 120. This meta-model definitional data may be used by the conversion scheme generator 208 to determine the content of the conversion scheme 204. According to another aspect of the present disclosure, definitional data may be accessed from the destination database system 120 by the conversion system 150 and imported to, for example, the conversion scheme generator 208. Thus, data path P256 and phantom data path P264 are illustrated to represent the additional/alternative means of providing the conversion scheme generator 208 with the definitional data representing the meta-model of the destination database system 120.

FIG. 3 is a flowchart illustrating an exemplary method of converting from the source database system 110 to the destination database system 120 for a conversion process 300, according to an aspect of the present disclosure. In block S302, the conversion system 150 imports the source system tables 112 and source semantic metadata 114 of the source database system 110 corresponding to a selected database system. The conversion system 150 completes the importing and performs a conversion scheme generation process 400, as described in more detail with reference to FIG. 4. The conversion system 150 operates according to a conversion scheme optimization process 1000, and in block S304 the conversion system 150 implements the conversion scheme 204 in the destination database system 120. In addition, the conversion system 150 exports conversion data, which includes the imported system tables 200 and any conversion system tables 206, to the destination database system 120 with the implementation of the conversion scheme 204 in block S304. The conversion system 150 determines if additional databases systems are to be converted in block S306 and imports source system tables and semantic metadata thereof in S302, otherwise the method of converting ends.

FIG. 4 is a flowchart illustrating an exemplary method of generating the conversion scheme 204 for the conversion scheme generation process 400, according to an aspect of the present disclosure. In block S402, the conversion system 150 analyzes the imported semantic metadata 202 and compares it to the meta-model of the destination database system 120. According to an aspect of the present disclosure, for the comparison, the conversion system 150 may derive definitional data regarding the meta-model of the source database system 110 from the imported semantic metadata 114, or receive isolated definitional data when the source system tables and semantic metadata 112, 114 are imported.

In block 404, the conversion system 150 determines whether the imported semantic metadata 202 can be directly implemented according to the meta-model of the destination database system 120. This may include evaluating the meta-model and determining whether the functionality of the imported semantic metadata 202 can be implemented, e.g. the metadata objects are the same as would be implemented in the destination database system 120, without recreating metadata. In the case where the imported semantic metadata 202 can be directly implemented, the conversion system 150 identifies the metadata objects of the imported semantic metadata 202 and may review the syntax of the metadata for errors/compatibility in block S406. Further, the conversion scheme 204 may be modified to include: the imported semantic metadata 202 for deployment in the destination database system 120; or a set of executable instructions that, once implemented in the destination database system 120, creates or imports the imported semantic metadata 202 as the destination semantic metadata 124.

In the case where the imported semantic metadata 202 cannot be directly implemented, the conversion system 150 executes an attribute definition process 500 as described in more detail with reference to FIGS. 6-8. In general, attributes function as holders of information and may provide context to data (fact data) held in the database 102 that represent different facts/data records (e.g., sale price of purchase, time of sale, duration of an operational procedure, etc.) that characterize aspects of transactions or other types of events that actually occur.

Upon completing the attribute definition process 500, the conversion system 150 may perform a metric definition process 900 as described in more detail with reference to FIG. 9. Metrics are metadata objects that in general, may aggregate fact data in a manner that may be interpreted as a measure and/or performance indicator. A metric may be a calculation to be performed on data stored in a database (similar to formulas in spreadsheet software), and a definition thereof may contain a formula that calls out data (via e.g. SQL expressions or portions thereof) to be used and a calculation to be performed. In block S408 the conversion system 150 defines a reports portion of the conversion scheme 204, and the conversion scheme 204 is finalized in block S410.

Figure 5:
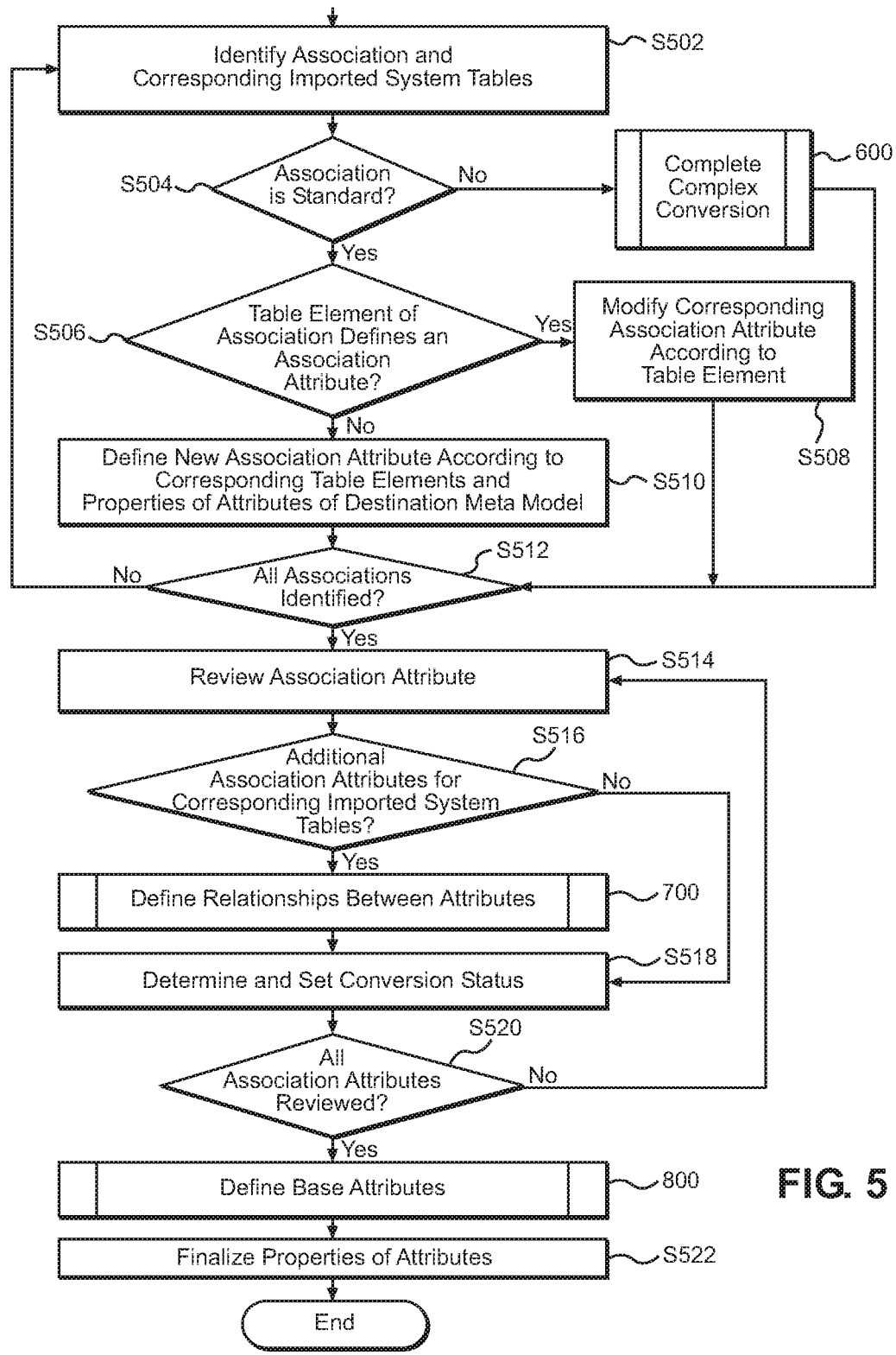
FIG. 5 is a flowchart illustrating an exemplary method of defining attributes in a conversion scheme, according to as aspect of the present disclosure.

FIG. 5 is a flowchart illustrating an exemplary method of defining attributes in the conversion scheme 204 for the attribute definition process 500, according to an aspect of the present disclosure.

According to an aspect of the present disclosure, an attribute is a metadata object, for example in the destination database system 120, that may represent at least one unique ID column in a lookup system table. A lookup system table may: be a system table converted from, or created based on, one of the imported system tables 200; be a physical representation of one or more attributes in, or to be instantiated in, the destination database system 120; store information for a given attribute in ID and description columns; store information about related attributes; and/or provide an ability to aggregate data within the database 102. A lookup system table may be distinguished from a fact system table, which may represent at least some fact data in the database tables 104 about transactions or other events that occur/have occurred. A fact system table may include table elements that relate to or represent both fact data and attribute information. One attribute may include several attribute expressions that each map to a respective table element in a system table (e.g. lookup, fact, or other system tables), and thereby a field/column of at least one of the database tables 104 of the database 102. Each attribute expression may be expressed as, for example, a portion of a clause in an SQL statement.

In block S502, the conversion system 150, in particular the conversion manager 152, reads/parses through the imported semantic metadata 202 to identify associations between table elements in the imported system tables 200 and returns the corresponding table elements. A table element may include a column or a group of columns in one of the imported system tables 200, or may refer to a portion of an SQL statement that represents one or more columns in the imported system tables 200. An association may cause, in the context of the source semantic metadata 114, the source database system 110 to merge contents of two different source system tables 110. Further, the association may be embodied in the form of an expression in the source/imported semantic metadata 112/202 that is written in SQL that may be a domain-specific language used to manage data held in the source database system 110. When implemented, such an expression may cause the source database system 110 to combine columns from one or more system tables, and thereby data from one or more fields/columns in the database tables 104, into a single view. According to another aspect of the present disclosure, an association may be embodied in an SQL clause that combines data by supplementing data from one system table with data from another system table.

In block S504, the conversion system 150 determines if an identified association is a standard association between table elements that exist as-is in the imported system tables 200, as opposed to being between one or more table elements that are derived from the imported system tables 200. Examples of standard associations may be those associations that are implemented through SQL clauses known in the art as corresponding to an inner join. Conversely, more complex associations may be implemented through SQL clauses known in the art as corresponding to outer joins, theta joins, etc. In the case that the association is determined not to be standard, the conversion system 150 completes a complex conversion process 600. Otherwise the conversion system 150 determines if a table element of the identified association defines a previously defined association attribute in block S506.

According to an aspect of the present disclosure, an association attribute is an attribute that is mapped to multiple table elements in the imported system tables 200 and/or any conversion system table 206. The table elements of an association attribute may represent data items used to: define or relate to additional attributes in, for example, a lookup system table in the destination database system 120; and/or characterize aspects of fact data represented by, for example, a fact system table in the destination database system 120. For example, an exemplary association attribute may be defined to include one table element corresponding to a column named Store_ID in a lookup system table, which provides a unique identification number for each store listed (once) in a column named Store_Name in the lookup system table. In addition, the exemplary association attribute may further be defined to include one table element corresponding to a column also named Store_ID that is in a fact system table, which provides the same unique identification number as it relates to what store an item was purchased in for each purchase transaction record in the database table that is represented by the fact system table.

The definition of the association attribute, e.g. the group of table elements encompassed by the association attribute, is updated to include table elements from the identified association in block S508 if the result of the evaluation in block S506 is affirmative. Otherwise, in block S510, the conversion system 150 defines a new association attribute according to the tables elements identified in block S502. The conversion system 150 parses through the semantic metadata in block S512 to determine if all associations have been identified and thus converted. In the case that all associations have not been identified, the conversion system 150 identifies another association and corresponding imported system tables 200 in block S502. Otherwise, the conversion system 150 reviews one or more of the newly defined association attributes in block S514.

In block S516, the conversion system 150 evaluates the imported system tables 200 in which the table elements that define the identified association attribute are found, to determine if any other attributes are defined by the other table elements in the imported system tables 200 being evaluated. In the case that other attributes are identified, the control system 150 completes a relationship definition process 700. Once the process 700 is complete, or if no other attributes are identified in block S516, the conversion system 150 determines a conversion status of the association attribute defined thereby in block S518.

The conversion system 150 determines the conversion status according to an evaluation of how well the definition of a newly defined association attribute matches with the definitions and functionalities of attributes as defined by the meta-model of the destination database system 120. Other aspects of the conversion status may be related to syntax. Further, the conversion system 150 may set the conversion status to reflect a conflict between tables elements that may be used in multiple attributes, or the compatibility of data types (e.g text, numeric, formulaic, etc.) of table elements grouped together in the definition of the attribute.

According to an aspect of the present disclosure, the conversion system 150 may set the conversion status of an association attribute that reflects a standard conversion to a "Ready" status. Where the association attribute is define through the complex conversion process 600, the conversion system 150 may set the conversion status to "Attention Needed," such that a user may be prompted to review the definition of the subject association attribute. Further, in the case that aspects of an association or a relationship are not determinable or definable through the operations encompassed by block S504, the complex conversion process 600, and/or the relationship definition process 700, the conversion system 150 may establish a conversion status of a corresponding association attribute to be "Review Compatibility." Thus, the conversion status may indicate to a user that more time and resources may be required to address any issues related to the subject attribute.

The conversion system 150 parses through the semantic metadata in block S520 to determine if all associations have been reviewed. In the case that all associations have been identified and thus converted, the conversion system 150 completes a base attribute definition process 800, as described in more detail with reference to FIG. 8. Further, the conversion system 150 finalizes the properties of the attributes (base and association) defined thereby in block S522 and the attribute definition process 500 ends.

Figure 6:
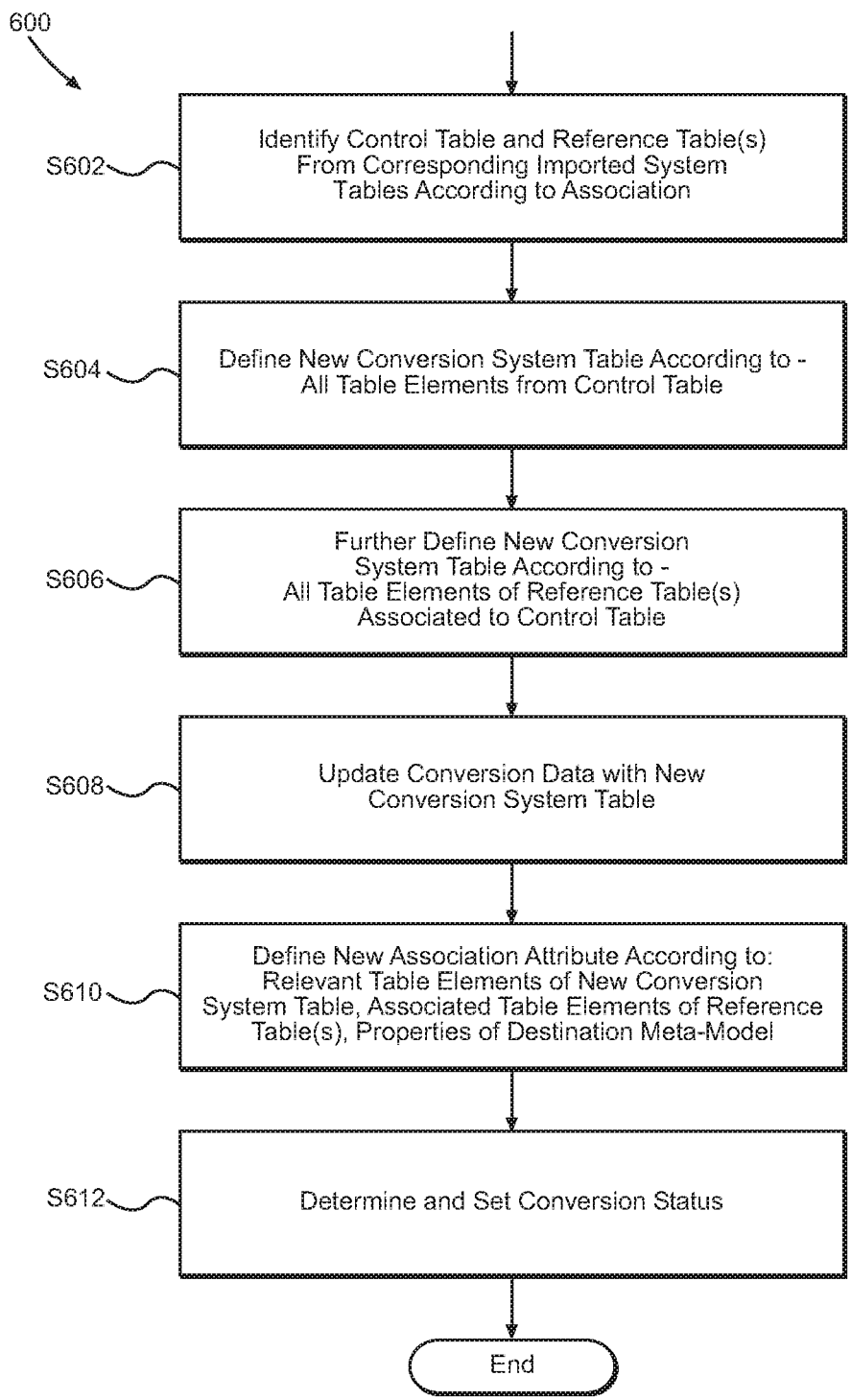
FIG. 6 is a flowchart illustrating an exemplary method of converting a complex association, according to as aspect of the present disclosure.

FIG. 6 is a flowchart illustrating an exemplary method of converting an association for the complex conversion process 600, according to an aspect of the present disclosure. In block S602, the conversion manager 152 identifies/locates the imported system tables 200 of the association identified in block S504 of the attribute definition process 500, and designates one imported system table as a control table, and the other imported system table or tables as reference tables. The conversion system 150 may determine the designations based on an evaluation of an SQL expression corresponding to the association. According to one aspect of the present disclosure, a portion of the SQL expression may include an outer join clause. The conversion system 150 may determine which of the imported system tables is being outer joined and designate that table as the control table. Further, the conversion system 150 may determine which of the imported system tables are not being outer joined and designate the table or tables as the reference table or tables.

In block S604, the conversion system 150 defines a new conversion system table to include all of the table elements of the control table in block S604. In block S606, the conversion system 150 further defines the conversion system table to include all of the table elements in the reference table(s) that are associated, per the association identified in block S504, with table elements of the control table. According to one aspect of the present disclosure, the conversion system table may be a physical table to be migrated along with the imported system tables 200 to the destination database system 120. According to another aspect of the present disclosure, the newly defined conversion system table may be in the form of an SQL query written in the conversion scheme 204 that maps directly to the imported system tables 200. According to either method, the conversion scheme 204 and the conversion data including the conversion system tables 206 are updated in block S608 to include the newly defined conversion system table.

In block S610, the conversion system 150 defines a new association attribute in terms of table elements of the reference table(s) and table elements in the conversion system table. For example, the new association attribute will be defined to comprise a grouping of: the table elements from the reference table that were associated to the table element of control table; and the relevant table elements of the conversion system table that correspond to the table elements of the control table associated with the table elements of the reference tables. In addition, the conversion system 150 will define the association attribute according to the properties of attributes as defined by the meta-model of the destination database system 120. In block S612, the conversion system 150 determines the conversion status of the association attribute and the complex conversion process 600 ends.

Figure 7:
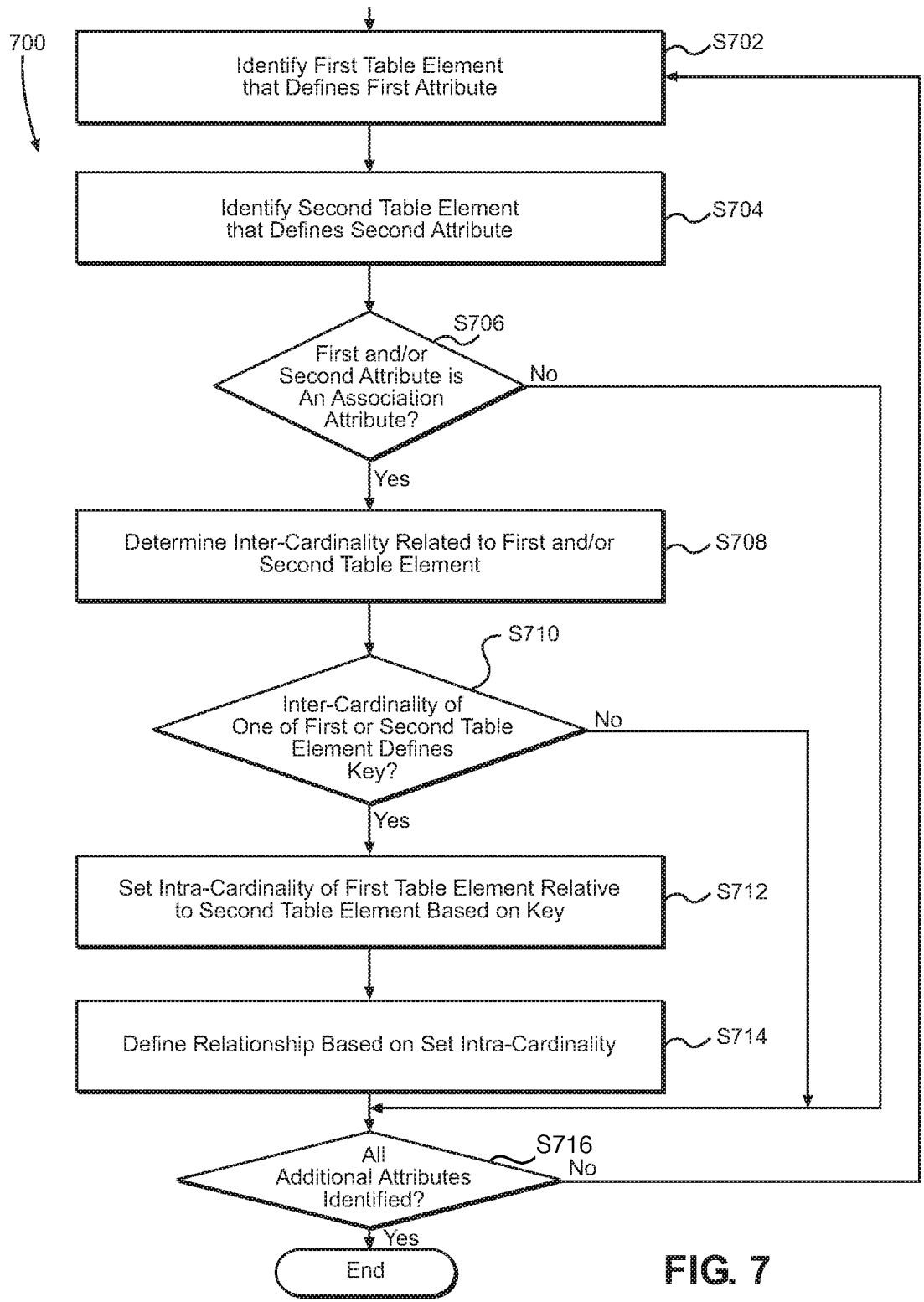
FIG. 7 is a flowchart illustrating an exemplary method of defining relationships between attributes, according to an aspect of the present disclosure.

FIG. 7 is a flowchart illustrating an exemplary method of defining relationships between attributes for the relationship definition process 700, according to an aspect of the present disclosure. In block S702, the conversion system 150 identifies a first table element in an imported or converted system table that defines, at least in part, an attribute (base or association). In block S704, the conversion system 150 identifies a second table element of the same imported or converted system table that defines, at least in part, a second attribute (base or association attribute). In block S706, the conversion system 150 determines if either of the first or second attributes is an association attribute.

In the case that at least one of the first and second attributes is an association attribute, the conversion system 150 determines and compares respective inter-cardinalities related to the first and/or second table elements. The inter-cardinalities are determined based on a review of all of the table elements that define the first and second attributes in block S708.

As one of ordinary skill in the art will understand, cardinality refers to a relationship between a number of times an element occurs in one entity as compared to a number of times the same or other element occurs in another entity. Inter-cardinality is defined herein to mean the cardinality between a table element in one system table and a table element in another system table, as indicated by the system data encompassed by the subject system tables. More specifically, in terms of one association attribute, inter-cardinality refers to cardinality between table elements of different system tables that define the association attribute.

Continuing with the example mentioned above related to Store_ID, each identification number of a set of identification numbers may occur once in the database table 104 corresponding to the lookup system table (as indicated by the system data encompassed by the lookup system table), while one or more of the identification numbers may occur several times in the database table 104 corresponding to the fact system table (as indicated by the system data encompassed by the fact system table). The cardinality between Store_ID of the lookup system table and Stored_ID of the fact system table, would then be one to many (1:M). Other cardinality relationships embodied by the data (system data) in the imported system tables 200, and identified by the conversion system 150, may include one-to-one (1:1), many-to-one (M:1), many-to-many (M:M), or undefined.

The conversion system 150 determines in block S710, if the inter-cardinality related to the first table element and/or the second table element indicates whether either of the first table element and/or the second table element defines a key of a respective system table including the first and second table elements. More specifically, the conversion system 150 determines if the first and/or second table elements can be utilized as an index in the respective system table, and therefore be implemented by the destination database system 120 to select unique data records (or unique combinations thereof) from the database tables represented by the imported or converted system tables corresponding to the first and second attributes.

If a key is defined, the conversion system 150 sets an intra-cardinality between first table element and the second table element in block S712 based on the key relationship determined in block S712. In contrast to inter-cardinality, intra-cardinality is defined herein to mean the cardinality between table elements in the same system table. Accordingly, the table elements referred to in an intra-cardinality relationship may not represent the same data. For example, a table element in the same system table as the Store_ID table element may be named Region_Name and provide the regional location of a given store.

According to an aspect the present disclosure, depending on the key relationship defined by the first or second table element, the intra-cardinality there between may be set as 1:1 or 1:M. According to an aspect of the present disclosure, where the conversion system 150 determines, for example, the first table element defines a key and has a 1:1 or 1:M inter-cardinality with an associated table element defining the first attribute, the conversion system 150 may automatically set the intra-cardinality of the first table element to the second table element to 1:1 or 1:M. Said determination of the of the second table element (1 or M) may be based on the type of system table, properties of the second table element, or a combination thereof. For example, the conversion system 150 may apply a protocol with respect to a lookup system table that includes table elements that define different attributes. In particular, the conversion system 150 may automatically set an intra-cardinality to 1:M (or 1:1) for each intra-cardinality relationship between: (a) a table element of the lookup system table that defines an association attribute and a key; and (b) any other table element of the lookup system table that defines an attribute (base or association).

In another example according an aspect of the present disclosure, the conversion system 150 may analyze/compare inter-cardinalities or lack thereof for the first and second table elements to determine an intra-cardinality. Accordingly, following a determination of the inter-cardinality of the first table element as in the above example, the system data related to the second table element (where the second attribute is not an association attribute) or the inter-cardinality of the second attribute may indicate data items of the second table element occur once in the database table corresponding to the system table including the first and second table element. Based on this determination, the conversion system may set the intra-cardinality of the first table element to the second table element as 1:1.

Based on the intra-cardinality set in block S712, the conversion system 150 defines a relationship between the first and second attributes in block S714. More specifically, the conversion system 150 will determine a parent-child relationship between the first and second attributes based on the intra-cardinality determined in block S714.

Potential parent-child relationships may include each data item in a parent attribute corresponds to one and only one data item in a child attribute, and each child attribute corresponds to one and only one data item in the parent attribute; each data item in a parent attribute corresponds to one or more data items in a child attribute, and each data item in the child attribute corresponds to one and only one data item in the parent attribute; and each data item in a parent attribute can have one or more children and each child data item in a child attribute can have one or more parents.

The parent-child relationship determined will provide a hierarchical relationship between the first and second attribute that is part of a logical data model for, in this case, the destination database system 120. A logical data model may be described as a logical arrangement of data as experienced by a general user. According to an aspect of the present invention, attributes as defined by the conversion system 150, may be related through a chain of parent-child relationships. From a functional standpoint, a hierarchy defined by the relationships defined by the conversion system 150, may be used to generate SQL, that in turn, may determine the output of a report implemented by the destination database system 120.

In continuing with the example involving Store_ID, the conversion system 150 may define a Store_ID attribute to include the table element Store_ID from a certain imported system table (as well as other Store_ID table elements from other system tables), and define the Store_ID table element to be a key for the certain imported system table. Further, the conversion system 150 may determine that any other attribute mapped to that same imported system table is a parent attribute of the Store_ID attribute. Thus, an attribute defined by Stored_ID would be a child of an attribute defined by, for example, a Region_Name table element included in the same imported system table.

Once a relationship is defined in block S714, or it is determined in block S710 that no inter-cardinality related to the first table element and/or the second table element indicates either of the first or second table elements defines a key, or it is determined that neither the first nor second attribute is an association attribute in block S706, the conversion system 150 determines if all additional attributes have been identified/evaluated in block S716. More specifically, the conversion system 150 determines if all additional attributes defined by table elements included in the imported system table corresponding to the attribute identified in block S514 or defined in block S806 discussed in more detail below, have been identified and reviewed. Where there are additional attributes that have not been identified, the conversion system 150 identifies a first table element in block S702. Otherwise the relationship definition process 700 ends.

Figure 8:
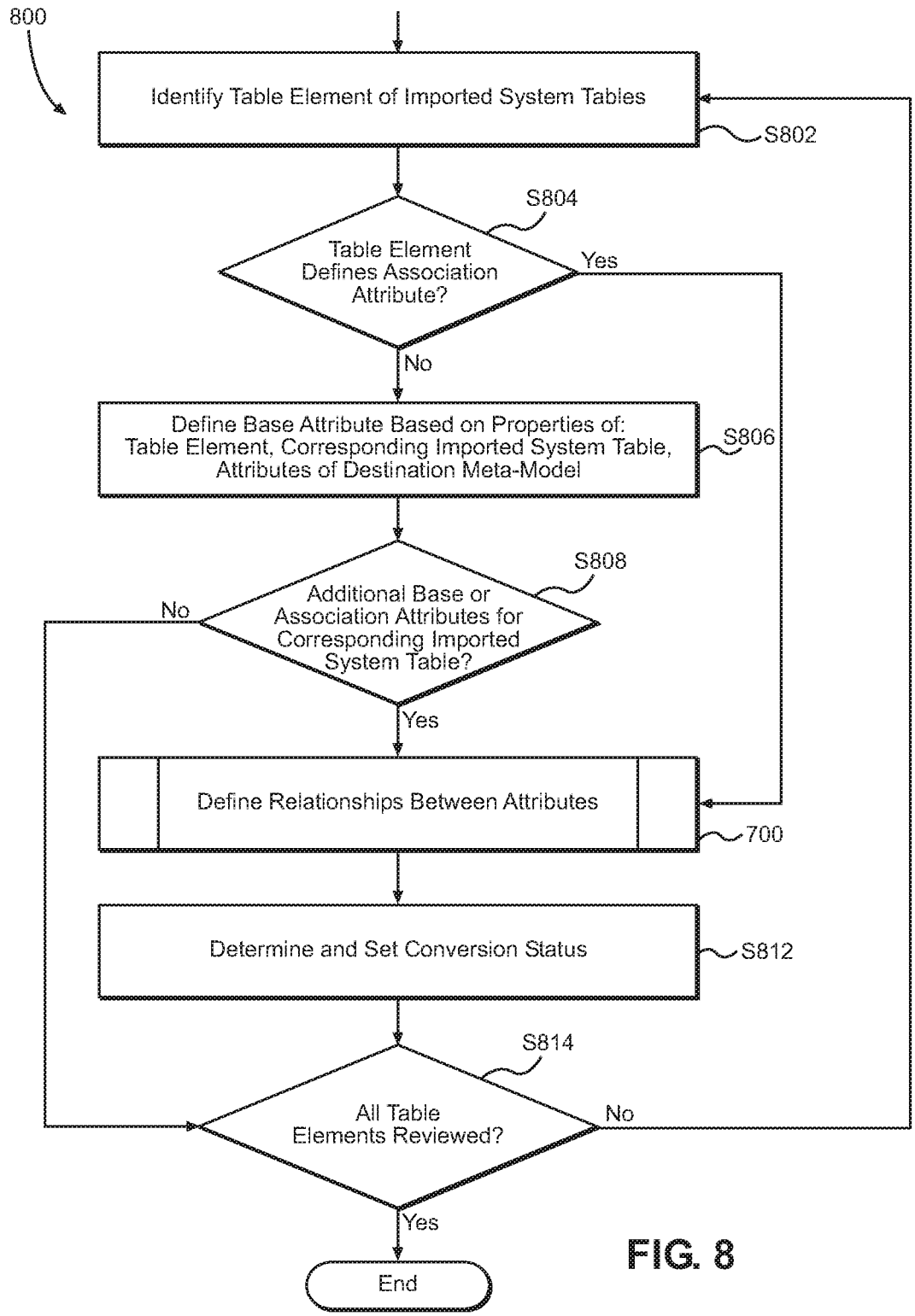
FIG. 8 is a flowchart illustrating an exemplary method of defining base attributes, according to an aspect of the present disclosure.

FIG. 8 is a flowchart illustrating an exemplary method of defining base attributes for the base attribute definition process 800, according to an aspect of the present disclosure.

A base attribute may be defined as a metadata object in the conversion scheme 204 according to only one table element in only one imported system tables 200. Depending on a type of the source database system 110, a table element may not be explicitly associated with any another table element, but include a definition that exists in other source system tables 200 (e.g. an aggregate table that uses a definition of the table element for pre-calculation on a higher level than a transactional level for query performance). According to an aspect of the present disclosure, the conversion system 150 may define a base attribute according to one table element, and define another base attribute according to a table element incorporating the definition of the one table element. According to an aspect of the present disclosure, the conversion system 150 may allow both base attributes to persist, or create an association attribute defined by the one table element and the other table element.

In block S802, the conversion system 150 identifies a table element of an imported system table; and in block S804, determines if the table element defines an association attribute previously defined in block S510 illustrated in FIG. 5 or in block S610 illustrated in FIG. 6. In the case that the table element does not define, at least in part, an association attribute, the conversion system 150 defines a new base attribute in block S806. In particular, the conversion system 150 analyzes the properties of the table element, the properties of the imported system table including the table element, and the properties of the attributes in the metamodel of the destination database system 120 to define the new base attribute.

In block S808, the conversion system 150 determines if the imported system table including the table element identified in block S802, includes table elements that define other base or association attributes. In the case that other attributes are defined by these other table elements of the imported system table, or if the table element defines in part, an association attribute as determined in block S804, the conversion system 150 defines relationships between the attributes through the relationship definition process 700. In block S812, the conversion system 150 determines the conversion status of the base attribute, and in block S814, determines if all table elements have been reviewed. In the case that there is at least one table element that is yet to be reviewed, the conversion system 150 identifies the table element in block S802. Otherwise, the exemplary method ends.

Figure 9:
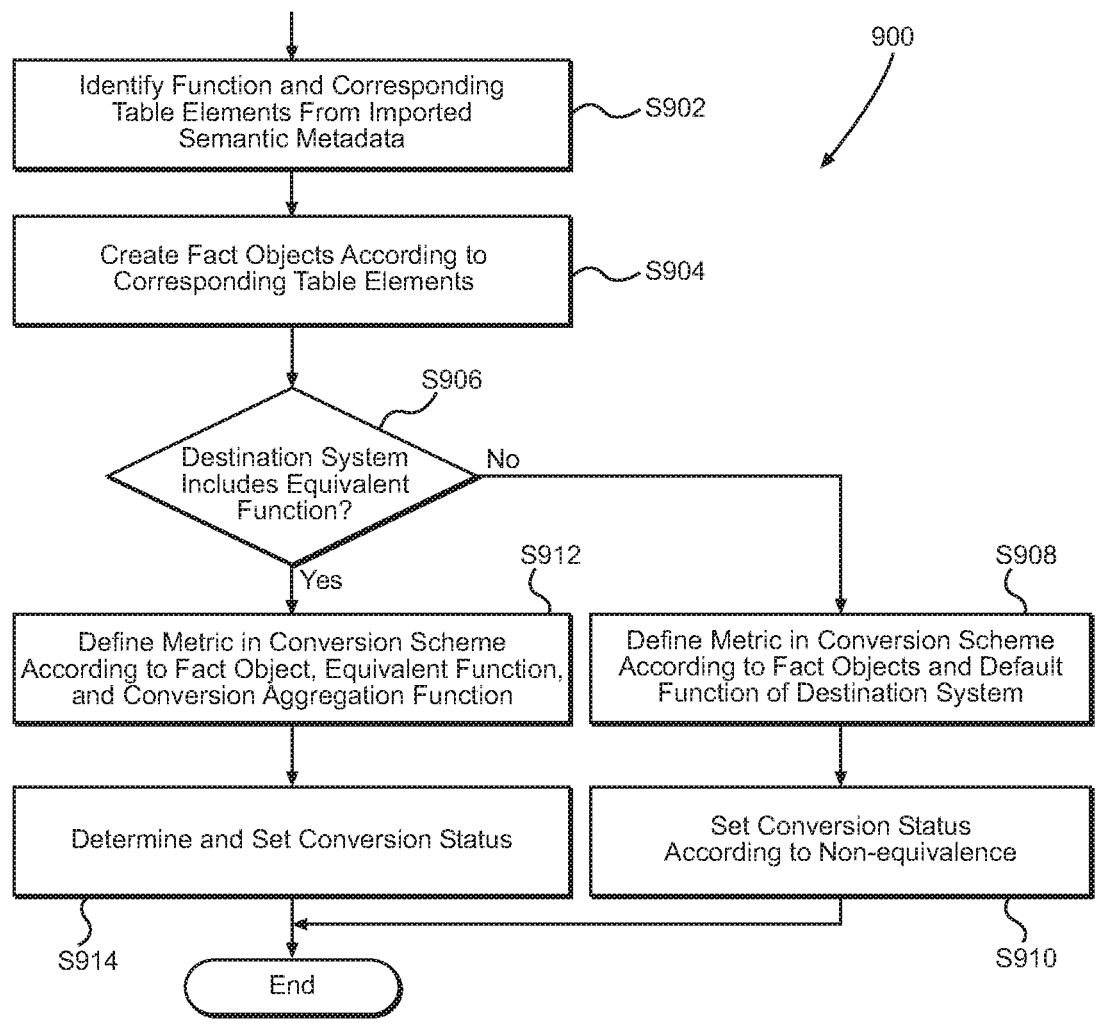
FIG. 9 is a flowchart illustrating an exemplary method of defining a metric, according to an aspect of the present disclosure.

FIG. 9 is a flowchart illustrating an exemplary method of defining a metric for a metric definition process 900, according to an aspect of the present disclosure. In block S902, the conversion system 150 identifies a function in the imported semantic metadata 202, and any corresponding table elements from the imported system tables 200 that are referenced in the function. In block S904, the conversion system 150 creates fact objects according to the table elements in the function expression in the imported semantic metadata 202. According to an aspect of the present disclosure, a fact object may be defined as a metadata object defined by a table element corresponding to a column within a fact system table, and encompass numerical data (but may include date or a text field aggregated with min, max, etc.) that may be aggregated or used in some calculation.

In block S906, the conversion system 150 determines if the destination database system 120 includes/is capable of implementing the same or equivalent function found in the expression of the imported semantic metadata 202. Where the destination database system 120 does not include an equivalent function, the conversion system 150 defines the metric in block S908 in the conversion scheme 204 according to the fact objects defined in block S904 and a default function of the destination database system 120. Further, the conversion system 150 sets the conversion status in block S910 to indicate the non-equivalence of functions between the imported semantic metadata 202 and the destination database system 120. In the case that the destination database system 120 does include the same function, the conversion system 150 defines a metric in block S912 according to the newly defined fact objects, equivalent function in the destination database system 120, and a conversion aggregation function. In block S914 the conversion system 150 sets a conversion status for the metric in the conversion scheme 204.

Advantages of the attribute definition process 6500 and the metric definition process 900 may include the provision of automatic mapping and conversion of the metadata objects of the source database system 110, to metadata objects in the destination database system 120. These mappings are made without, or at most minimal, user input on an individual metadata object level. In particular, a user may not be required to do numerous modifications in the destination database system 120 after conversion data (including system data) is migrated in order to enable to the destination database system 120 to provide the same data reporting capabilities of the source database system 110. Accordingly, the conversion system 150 reduces the time and effort needed to convert from the source database system 110 to the destination database system 120. Another advantage of the conversion system 150 and the conversion process 300 is the ability, through the optimization process 1000, to review and change the automatic mappings discussed above before conversion data is migrated to the destination database system 120.

Figure 10:
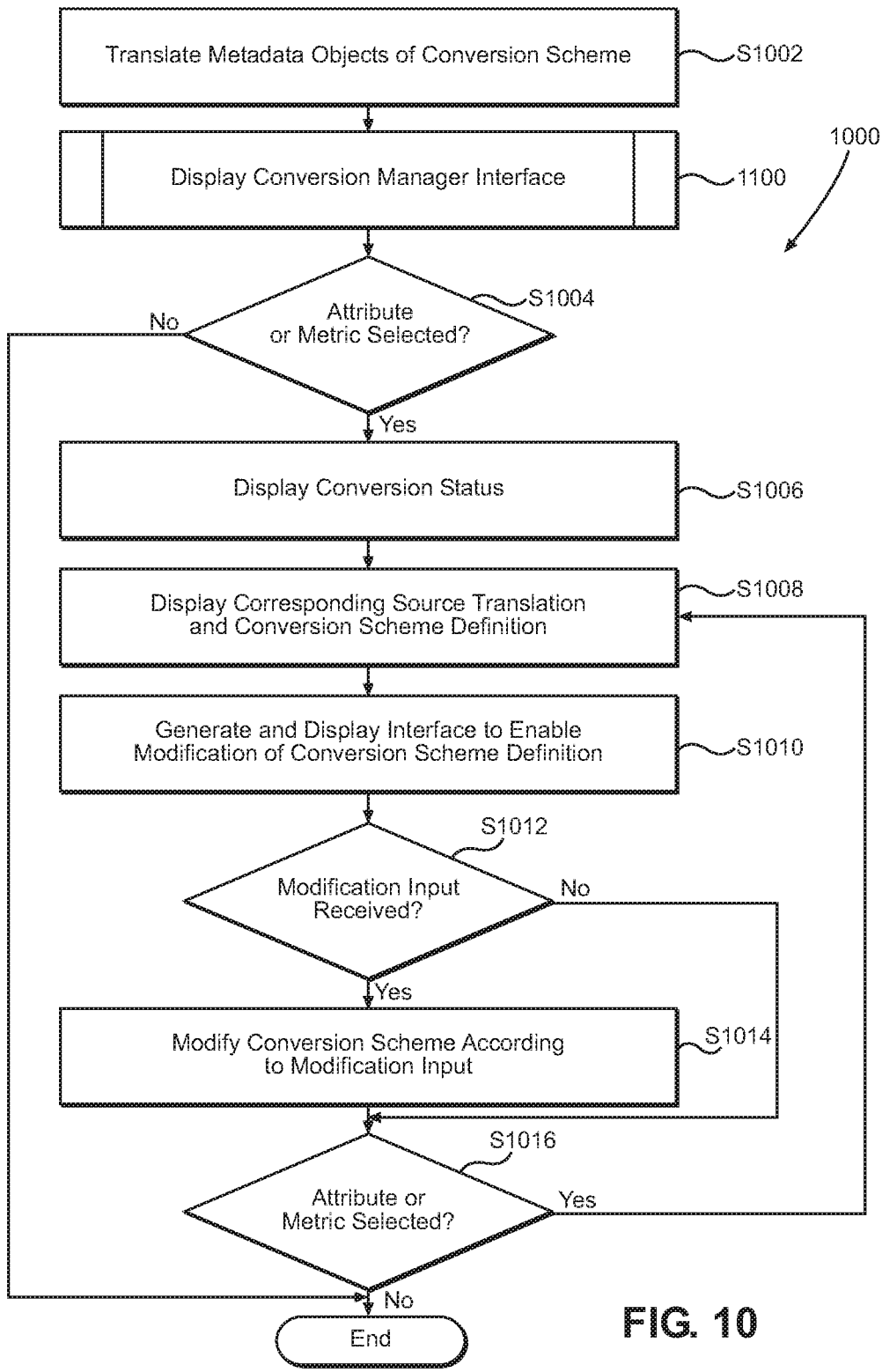
FIG. 10 is a flowchart illustrating an exemplary method of optimizing a conversion scheme, according to an aspect of the present disclosure.

FIG. 10 is a flowchart illustrating an exemplary method of optimizing a conversion scheme for an optimization process 1000, according to an aspect of the present disclosure. In block S1002, the conversion system 150 translates metadata objects (attributes, metrics) of the conversion scheme 204 in terms of the source database system 110 into a translation as previously described. As illustrated in FIG. 10, the control system 150 completes a conversion manager interface display process 1100. As discussed in more detail with reference to FIGS. 11-13, with the conversion manager interface display process 1100, the view generator 212 of the conversion system 150 generates a conversion manager interface that is output by the communication interface 222 to the GUI 142. The conversion manager interface including any translations and the definitions of any attributes or metrics defined in the conversion scheme 204. An example of the conversion manager interface according to the present disclosure is illustrated in FIG. 12 as Conversion Manager Interface 1200.

The computing device 140 may receive a selection of a metric or attribute in block S1004 via the I/O devices 220 and/or the GUI 142, such that the GUI 142 displays a conversion status of the selected attribute or metric in block S1006. In block S1008, the conversion system 150 causes the GUI 142 to display a source translation of the metric or attribute and the corresponding editable conversion scheme definition. The conversion system 150 provides an interface in block S1010 for modification of the conversion scheme definition. In block S1012 a modification input is received, and the conversion system 150 modifies the conversion scheme definition in the conversion scheme 204 according to the input in block S1014. In addition, a conversion status of a selected attribute or metric may be changed through the conversion manager interface. Alternatively, the conversion status may be changed in response, and based on, the modification input. In block S1016, the conversion system 150 determines if another attribute or metric is selected.

Figure 11:
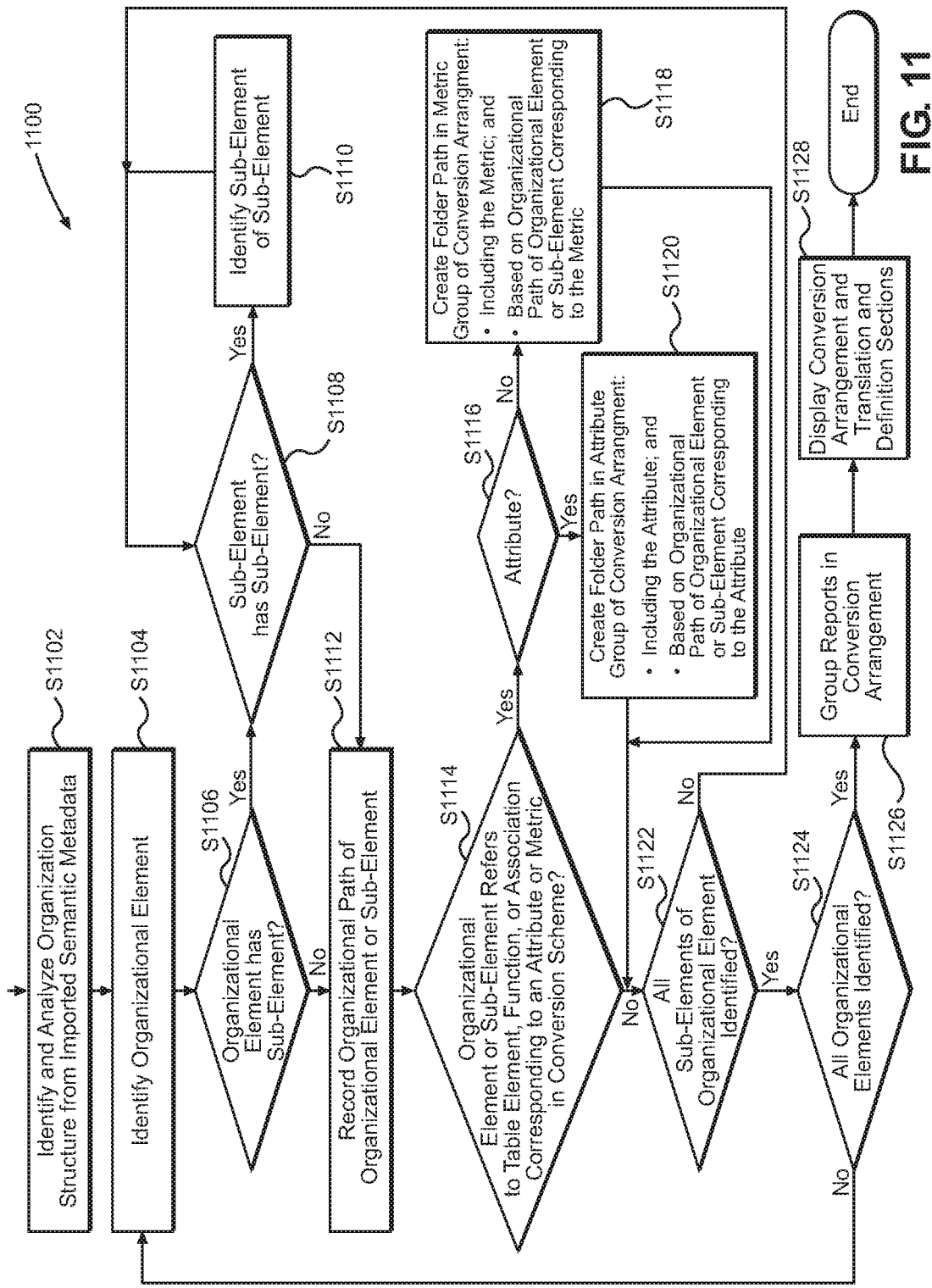
FIG. 11 is a flowchart illustrating an exemplary method of displaying a conversion manager interface, according to an aspect of the present disclosure.

FIG. 11 is a flowchart illustrating an exemplary method of displaying a conversion manager interface for the conversion manager interface display process 1100, according to an aspect of the present disclosure. In block S1102, the conversion system 150 obtains/identifies an organizational structure from the imported semantic metadata 114, or alternatively in a separate file from the source database system 110. The organizational structure may be a data structure in the source semantic metadata 114 that organizes data entities (e.g., objects, dimensions, measures, filters, or other types of data entities which are defined by the data elements/metadata objects in the source database system 110, and given different names, according to the type of database system provided as the source database system 110) defined by the imported semantic metadata 114. These data entities may be metadata objects by themselves, and/or derived from the metadata objects defined by the imported semantic metadata 114. Further, the organizational structure may be embodied as or define a folder structure that can be viewed and changed through a graphical user interface operating with, or implemented by, the source database system 110.

In block S1104, the conversion system 204 identifies from the organizational structure (e.g. the source semantic metadata 114) and organizational element. An organizational element may include a folder or data entity as described above. In block S1106, the conversion system determines whether the identified organizational element includes a sub-element. A sub-element may include a sub-folder, sub-folder of a sub-folder, a data entity, or a sub-element of a data entity. More specifically, the conversion system 150 determines in block S1106 if the organizational element is a folder or a data entity. In the case of the organizational element being a data entity, the conversion system 150 will record the organizational path of the organization element (which will be the element itself) in a conversion arrangement included in the conversion scheme 204.

The conversion arrangement may include a portion of the metadata or portion of the set of instructions encompassed by the conversion scheme 204. Upon implementation or execution of the conversion arrangement by the conversion system 150, the view generator 212 generates a graphical representation of the conversion arrangement (1210 of FIG. 12) which embodies the organizational structure of the source database system 110 in terms of, and grouped thereby, the attributes, metrics, and reports defined by, or to be created through the implementation of, the conversion scheme 204.

Further with regards to block S1106, in the case of the organizational element being a folder, at least one sub-element will be included therewith, and the conversion system 150 will determine if the sub-element itself includes a sub-element in block S1108. If there is an affirmative determination in block S1108, the conversion system 150 will identify the sub-element (e.g., the sub-sub-element) of the sub-element in block S1110, and repeat the evaluation in block S1108 with respect to the sub-element of the sub-element. This process may continue until the conversion system 150 determines a further sub-element is not present, and records the organizational path (e.g. path of folders and sub-folders in which sub-elements are grouped) of the sub-element in the conversion arrangement in block S1112.

In block S1114, the conversion system 150 determines if the organizational element or sub-element refers to, or is otherwise defined by, a table element in the imported system tables 200 or a function or association in the imported semantic metadata 202, that corresponds to (e.g. defines) an attribute or metric in the conversion scheme 204. If a correspondence is identified, the conversion system 150 determines if the correspondence is to an attribute or a metric in block S1116. In the case of a metric, in block S1118, the conversion system 150 creates (writes) a folder path in a metric group of the conversion arrangement that: (a) includes the identified metric; and (b) is based on the organizational path of the organizational element or sub-element corresponding to the identified metric. In the case of an attribute, in block S1120, the conversion system 150 creates (writes) a folder path in an attribute group of the conversion arrangement that: (a) includes the identified attribute; and (b) is based on the organizational path of the organizational element or sub-element corresponding to the identified attribute. In general, a folder path of an attribute or metric will reflect an organizational path of a corresponding data entity as defined by a user of the source database system 110. In some cases, the folder path may mimic the hierarchy defined by the relationships defined in the relationship definition process 700.

The folder path for the metric or attribute is created in block S1118 or S1120 respectively, and the conversion system 150 determines if all of the sub-elements of a currently identified organizational element have been identified in block S1122. In other words, the conversion system 150 determines if all of the data entities encompassed by the organizational element have been identified and evaluated with respect to a possible correspondence to a metric or attribute of the conversion scheme 204. In addition, the conversion system 150 determines if all sub-elements have been identified in block S1122 following a determination in block S1114 that an organizational element or sub-element does not correspond in some manner to an attribute or metric of the conversion scheme 204.

In the case of there being more sub-elements, the conversion system 150 determines whether a current sub-element includes a sub-element in block S1108. Otherwise, the conversion system determines whether all organizational elements (i.e. the highest level elements in the organizational structure) have been identified in block S1124. In the case of there being more organizational elements in the organizational structure, the conversion system 150 identifies another organizational element in block S1104. Otherwise, the conversion system 150 groups any reports represented in the organizational structure and corresponding to a report defined in block S408 in a reports group of the conversion arrangement in block S1126. In block S1128, the conversion system 150, in particular the view generator 212 generates a display including the conversion arrangement and translation and definition sections, which is output to the GUI 142 by the communication interface 222.

Figure 12:
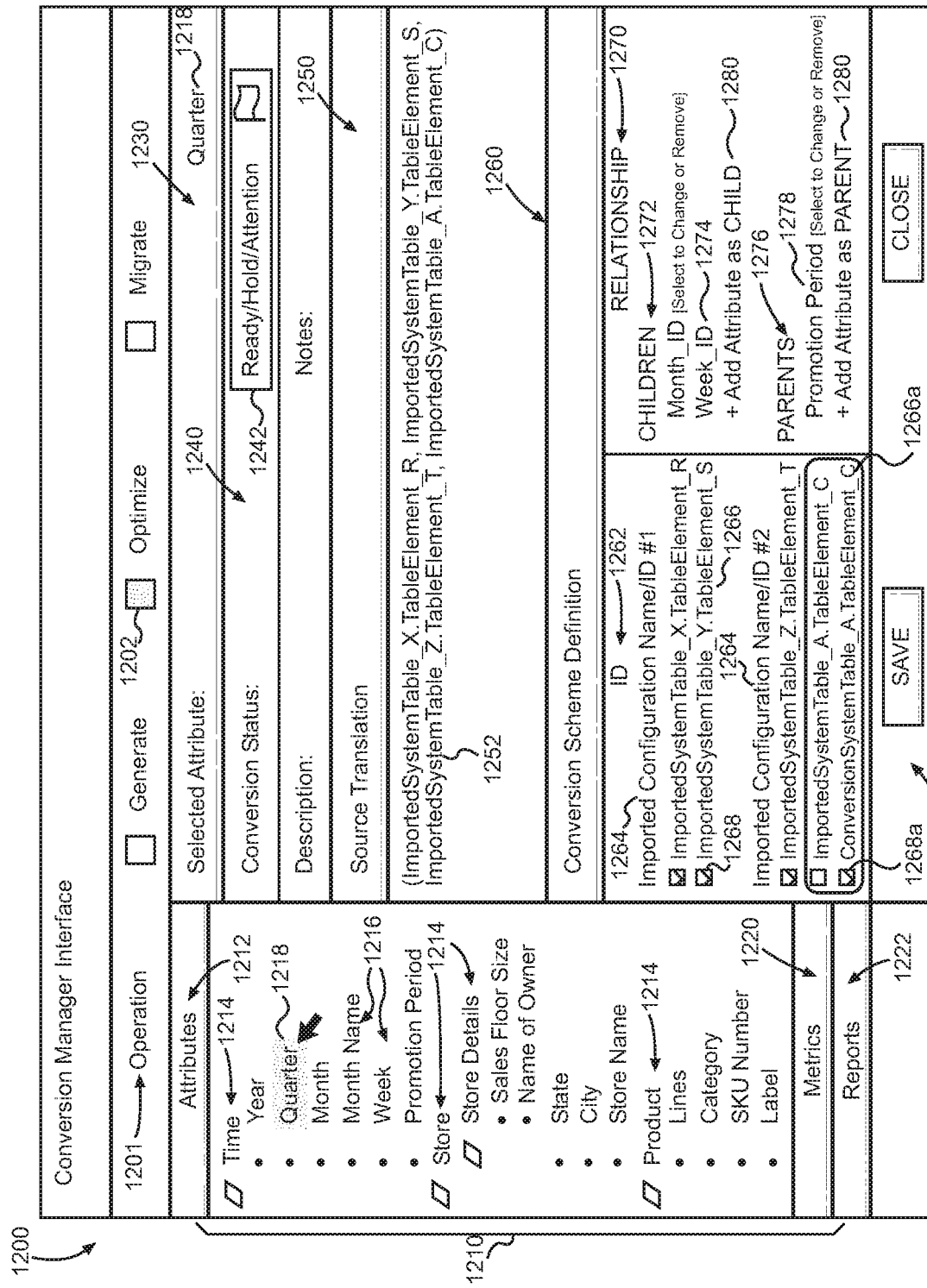
FIG. 12 illustrates an exemplary representation of a graphical use interface for a conversion system, according to an aspect of the present disclosure.

FIG. 12 illustrates an exemplary representation of a graphical user interface for the conversion system 150—the Conversion Manager Interface 1200, according to an aspect of the present disclosure. In particular, FIG. 12 illustrates an Operation section 1201 for selecting, via a respective selector 1202, an operation: of generating the conversion scheme 204 (Generate); optimizing the conversion scheme 204 (Optimize); and migrating the conversion scheme 204 and conversion data (including the imported system tables 200 and any conversion system tables 206) to the destination database system 120 (Migrate). According to an aspect of the present disclosure, a selection of the Migrate operation may cause the conversion system 150 to implement, or have the destination database system 120 implement, the conversion scheme 204 and conversion data in the destination database system 120.

A conversion arrangement view 1210 is provided on the left side of the Conversion Manager Interface 1200 and provides selectable Attribute, Metric, and Report groups 1212, 1220, 1222, for viewing the groups defined in the portion of the conversion scheme 204 corresponding to the conversion arrangement. As illustrated in FIG. 12, attributes 1216 are arranged in folder paths 1214 according to the conversion arrangement defined in the conversion manager interface display process 1100. According to an aspect of the present disclosure, a selection of a folder path 1214, for example the Time folder path 1214, may cause the folder to expand such that all respective attributes are displayed, or collapse such that only the folder path (i.e. Time) is displayed in the Attribute group 1212.

According to an aspect of the present disclosure, the organizational structure of the source database system 110 may include, for example, sub-elements sharing a same organizational path. For example, there may be two or more sub-elements ("sub-sub-sub-elements") that are sub-elements of a sub-element, which is a sub-element (sub-sub-element) of another sub-element, which is a sub-element of an organizational element in the organizational structure.

One of the sub-sub-sub-elements may correspond to an attribute, and another of the sub-sub-sub-elements may correspond to a metric in the conversion scheme 204. As a result, the conversion system 150 will create a folder path 1214 representing the organizational path that includes the organizational element, the sub-element, the sub-sub-element, and a respective sub-sub-sub-element in each of the Attribute group 1212 and the Metric group 1220 of the conversion arrangement to be displayed in the conversion arrangement view 1210.

More concretely, the organizational structure of the source database system 110 may include an organizational path corresponding to the folder path 1214 including a Store folder and a Store Details sub-folder ("Store folder path 1214") illustrated in FIG. 12. Further, the organizational structure may include data entities corresponding to the attributes 1216 defined as "Sales Floor Size" and "Name of Owner." In addition, the organizational structure may include a data entity corresponding a metric (not shown) defined in the metric definition process 900. One of ordinary skill in the art will understand that upon selection of the Metrics group 1220, respective folder paths will be displayed. Further, according to an aspect of the present disclosure, the Metric group 1220 will include a respective version of the Store folder path 1214 including a Store folder and a Store Details sub-folder in which a metric will be located. Said metric corresponding to a data entity in the organizational structure sharing the same organizational path as the data entities corresponding to the Sales Floor Size and Name of Owner attributes.

As illustrated in FIG. 12, a Quarter attribute is a selected attribute 1218 for the purposes of illustration, and displayed in a Selected Attribute section 1230 of the Conversion Manager Interface 1200. The Conversion Manger Interface 1200 includes a Conversion Status section 1240 and a status selector 1242 for viewing and/or changing a conversion status of the selected attribute 1218. A Source Translation section 1250 may include a translation expression 1252 written in terms of the imported semantic metadata 202, which has been mapped to the selected attribute 1218. A Conversion Scheme Definition section 1260 includes an ID section 1262 and a Relationship section 1270 to display the editable definition of the selected attribute 1218.

The ID section 1262 includes one or more names which correspond to each Name 1264 of a table element that defines the selected attribute 1218 in the conversion scheme 204 defines. Each table element 1266, which may be expressed in code (SQL), is listed below the appropriate Name 1264 and includes an element selector 1268 which can be selected or de-selected to change a definition of the selected attribute 1218. As illustrated in FIG. 12, the selected attribute 1218 is defined, in part, by a table element 1266a of a conversion system table via element selectors 1268a provided for the conversion system table and the imported system table elements. As illustrated in FIG. 12, the table element of imported system table (which was identified in order to generate the conversion system table) is not (but may be) selected, while the table element of the conversion table element is selected.

The Relationship section 1270 shows the attributes that are related to the selected attribute 1218 in a Children sub-section 1272 and a Parent sub-section 1276. The child attributes 1274 can be changed or added to via a child/parent add selector 1280. Likewise, the parent attributes 1274 can be changed or added to via a child/parent add selector 1280. Further the Conversion Manager Interface 1200 includes a Save and Close section 1290 for saving any modifications and exiting the Optimize operation.

Figure 13:
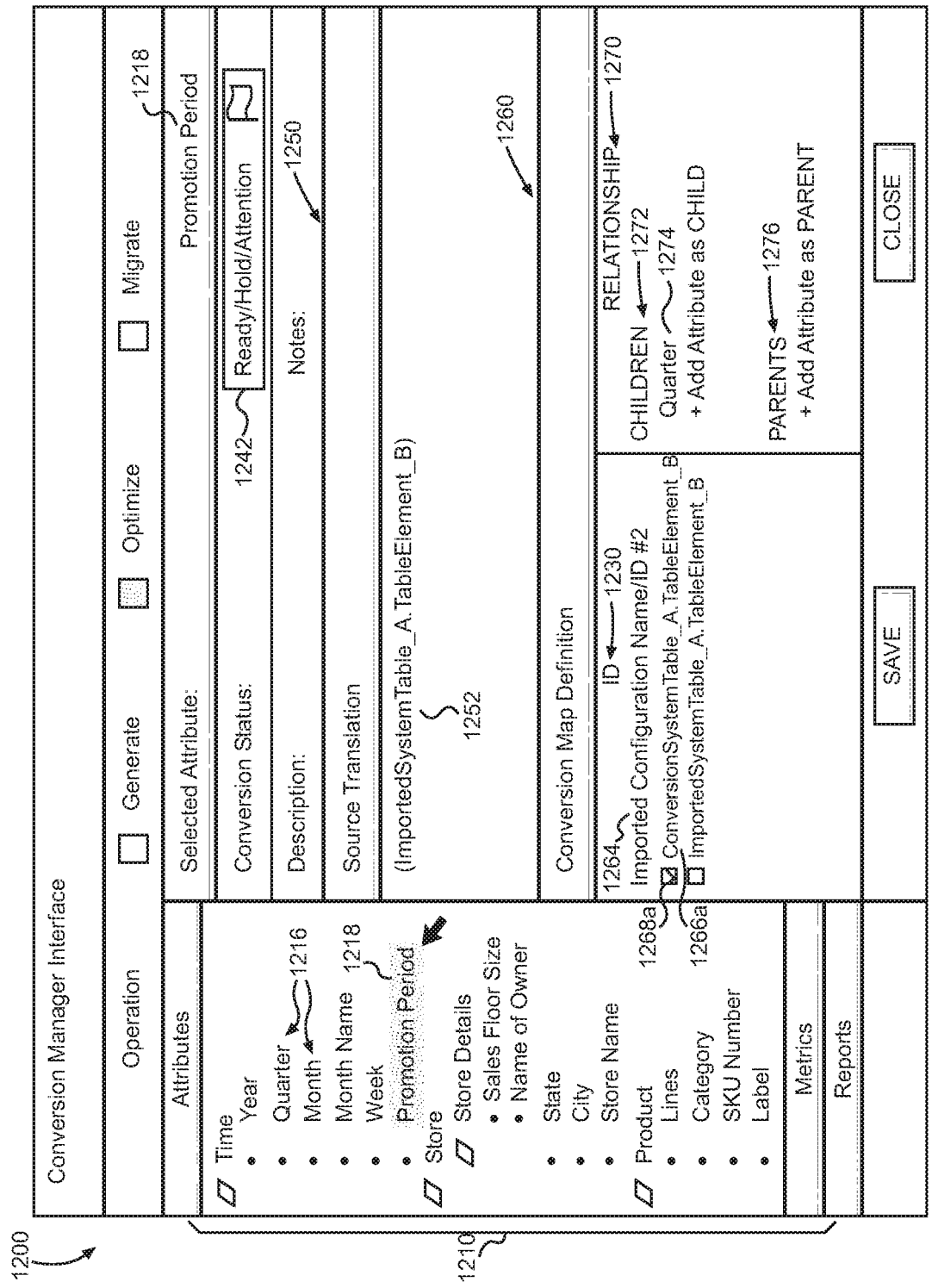
FIG. 13 illustrates an exemplary representation of a graphical use interface for a conversion system, according to an aspect of the present disclosure.

FIG. 13 illustrates an exemplary representation of the graphical user interface for the conversion system 150—the Conversion Manager Interface 1200, according to an aspect of the present disclosure. In particular, FIG. 13 shows the translation and conversion scheme definition for another attribute, Promotion Period that has been selected. As illustrated in FIGS. 12 and 13, the selected attribute 1218 of FIG. 13, Promotion Period, is a parent attribute of the selected attribute 1218 of FIG. 12, Quarter. As illustrated in FIG. 13, the Promotion Period attribute is defined in the ID section 1260 as including a table element 1266a from a conversion system table, and in the Relationship section 1270 as having a child—the Quarter attribute.

It will be appreciated that the foregoing description provides examples of the disclosed conversion system. These examples given above are merely illustrative and are not meant to be an exhaustive list of all possible designs, aspects, applications or modifications of the disclosure. Further, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

I claim:

1. A computer-implemented method of converting from a source database system to a destination database system, the method comprising:
   importing system tables ("imported system tables") and semantic metadata ("imported semantic metadata") from the source database system into a metadata database;
   parsing the imported semantic metadata and identifying associations between table elements of the imported system tables;
   generating a conversion scheme in the metadata database; and
   defining an attribute in the conversion scheme in accordance with a meta-model of the destination database system for each association identified,
   wherein defining each attribute corresponding to an association includes:
      identifying, for each imported system table that includes a table element specified in the association, additional attributes,
      determining an inter-cardinality between the specified table elements,
      setting, according to the determined inter-cardinality, for each additional attribute identified, an intra-cardinality between a table element of the additional attribute and a specified table element included in a same one of the imported system tables that includes the table element of the additional attribute,
      defining, for each additional attribute identified, a relationship between the attribute and the additional attribute according to the determined inter-cardinality and a respective intra-cardinality, and
      grouping together the specified table elements and any defined relationships in a metadata definition of the attribute in the conversion scheme.

2. The computer-implemented method of claim 1, wherein a meta-model implemented by the source database system is different from a meta-model implemented by the destination database system.

3. The computer-implemented method of claim 1, wherein defining each attribute includes defining at least one attribute by:
- determining an association corresponding to the at least one attribute is between a first table element from one of the imported system tables and a second table element that is derived from one or more of the imported system tables,
- defining a conversion system table in the conversion scheme to include a table element corresponding to the first table element and all of the table elements of the one or more of the imported system tables including a table element corresponding to the second table element, and
- grouping together the first table element and the table element of the conversion system table corresponding to the second table element in a metadata definition of the at least one attribute.

4. The computer-implemented method of claim 1, further comprising:
- determining a conversion status of at least one attribute corresponding to at least one association; and
- displaying a conversion status of the at least one attribute in a graphical user interface.

5. The computer-implemented method of claim 1, further comprising:
- displaying a definition of at least one attribute in a graphical user interface including a list of table elements that define the at least one attribute;
- receiving a modification input through the graphical user interface to do one of add and remove at least one of the table elements that define the at least one attribute; and
- modifying a metadata definition in the conversion scheme for the at least one attribute according to the modification input.

6. The computer-implemented method of claim 1, further comprising:
- displaying a definition of at least one attribute in a graphical user interface including a list of relationships between the at least one attribute and other attributes;
- receiving a modification input through the graphical user interface to do one of add, remove, and change at least one of the relationships that define the at least one attribute; and
- modifying a metadata definition in the conversion scheme for the at least one attribute and an attribute corresponding to the at least one of the relationships according to the modification input.

7. The computer-implemented method of claim 1, further comprising:
- displaying a translation of at least one attribute in a graphical user interface including an expression provided in a form of the imported semantic metadata and corresponding to table elements included in any association corresponding to the at least one attribute,
- wherein the graphical user interface displays the at least one attribute which is mapped to the expression and a definition in the conversion scheme of the at least one attribute.

8. The computer-implemented method of claim 1, further comprising:
- identifying a function in the imported semantic metadata and corresponding table elements from the imported system tables referenced in the function;
- defining at least one fact object according to the corresponding table elements;
- determining the destination database system implements the function; and
- defining a metric according to the at least one fact object, an equivalent function in the destination database system, and an aggregation function.

9. The computer-implement method of claim 1, further comprising:
- exporting the conversion scheme to the destination database system;
- exporting the imported system tables to the destination database system; and
- implementing the conversion scheme in the destination database system,
- wherein implementing the conversion scheme includes creating attributes in the destination database system corresponding to each attribute defined in the conversion scheme.

10. The computer-implement method of claim 3, further comprising:
- exporting the conversion scheme to destination database system;
- exporting the imported system tables to the destination database system;
- exporting at least one conversion system table defined by the conversion scheme; and
- implementing the conversion scheme in the destination database system,
- wherein implementing the conversion scheme includes creating attributes and at least one system table in the destination database system corresponding to each attribute and the at least one conversion system table defined in the conversion scheme.

11. A system comprising:
one or more computing devices including at least one processor, and
a non-transitory computer-readable medium coupled to the one or more computing devices having instructions stored thereon which, when executed by the one or more computing devices, cause the one or more computing devices to perform operations comprising:
- importing system tables ("imported system tables") and semantic metadata ("imported semantic metadata") from a source database system into a metadata database,
- parsing the imported semantic metadata and identifying associations between table elements of the imported system tables,
- generating a conversion scheme in the metadata database, and
- defining an attribute in the conversion scheme in accordance with a meta-model of a destination database system for each association identified,
- wherein defining each attribute corresponding to an association includes:
  - identifying, for each imported system table that includes a table element specified in the association, additional attributes,
  - determining an inter-cardinality between the specified table elements,
  - setting, according to the determined inter-cardinality, for each additional attribute identified, an intra-cardinality between a table element of the additional attribute and a specified table element included in a same one of the imported system tables that includes the table element of the additional attribute, defining, for each additional attribute identified, a relationship between the attribute and the additional attribute according to the determined inter-cardinality and a respective intra-cardinality, and grouping together the specified table elements and any defined relationships in a metadata definition of the attribute in the conversion scheme.

12. The system of claim 11, wherein a meta-model implemented by the source database system is different from a meta-model implemented by the destination database system.

13. The system of claim 11, wherein defining each attribute includes defining at least one attribute by:

determining an association corresponding to the at least one attribute is between a first table element from one of the imported system tables and a second table element that is derived from one or more of the imported system tables, defining a conversion table in the conversion scheme to include a table element corresponding to the first table element and all of the table elements of the one or more of the imported system tables including a table element corresponding to the second table element, grouping together the first table element and the table element of the conversion table corresponding to the second table element in a metadata definition of the at least one attribute.

14. The system of claim 11, wherein the non-transitory computer-readable medium is further configured to perform operations including:

determining a conversion status of at least one attribute corresponding to at least one association, and displaying the conversion status of the at least one attribute in a graphical user interface.

15. The system of claim 11, wherein the non-transitory computer-readable medium is further configured to perform operations including:

displaying a definition of at least one attribute in a graphical user interface including a list of table elements that define the at least one attribute, receiving a modification input through the graphical user interface to do one of add and remove at least one of the table elements that define the at least one attribute, and modifying a metadata definition in the conversion scheme for the at least one attribute according to the modification input.

16. The system of claim 11, wherein the non-transitory computer-readable medium is further configured to perform operations including:

displaying a definition of at least one attribute in a graphical user interface including a list of relationships between the at least one attribute and other attributes, receiving a modification input through the graphical user interface to do one of add, remove, and change at least one of the relationships that define the at least one attribute, and modifying a metadata definition in the conversion scheme for the at least one attribute and an attribute corresponding to the at least one of the relationships according to the modification input.

17. The system of claim 11, wherein the non-transitory computer-readable medium is further configured to perform the operation including displaying a translation of at least one attribute in a graphical user interface including an expression provided in a form of the imported semantic metadata and corresponding to table elements included in any association corresponding to the at least one attribute, and wherein the graphical user interface displays the at least one attribute which is mapped to the expression and a definition in the conversion scheme of the at least one attribute.

18. The system of claim 11, wherein the non-transitory computer-readable medium is further configured to perform operations including:

identifying a function in the imported semantic metadata and corresponding table elements from the imported system tables referenced in the function, defining at least one fact object according to the corresponding table elements;

determining the destination database system implements the function, and defining a metric according to the at least one fact object, an equivalent function in the destination database system, and an aggregation function.

19. The system of claim 13, wherein the non-transitory computer-readable medium is further configured to perform operations including:

exporting the conversion scheme to the destination database system, exporting the imported system tables to the destination database system, exporting at least one conversion system table defined by the conversion scheme, and implementing the conversion scheme in the destination database system, and wherein implementing the conversion scheme includes creating attributes and at least one table in the destination database system corresponding to each attribute and the at least one conversion table defined in the conversion scheme.

20. A non-transitory computer-readable medium having instructions stored thereon which, when executed by the one or more computing devices, cause the one or more computing devices to:

import system tables ("imported system tables") and semantic metadata ("imported semantic metadata") from a source database system into a metadata database;

parse the imported semantic metadata and identify associations between table elements of the imported system tables;

generate a conversion scheme in the metadata database; and define an attribute in the conversion scheme in accordance with a meta-model of a destination database system for each association identified, wherein, to define each attribute corresponding to an association, the non-transitory computer-readable medium causes the one or more computing devices to:

identify, for each imported system table that includes a table element specified in the association, additional attributes, determine an inter-cardinality between the specified table elements, set, according to the determined inter-cardinality, for each additional attribute identified, an intra-cardinality between a table element of the additional attribute and a specified table element included in a same one of the imported system tables that includes the table element of the additional attribute, define, for each additional attribute identified, a relationship between the attribute and the additional attribute according to the determined inter-cardinality and a respective intra-cardinality, and group together the specified table elements and any defined relationships in a metadata definition of the attribute in the conversion scheme.

* * * * *